United States Patent
Cardente et al.

(10) Patent No.: US 12,541,717 B2
(45) Date of Patent: Feb. 3, 2026

(54) METHOD AND SYSTEM FOR GENERATING MACHINE LEARNING TRAINING DATA STREAMS USING UNSTRUCTURED DATA

(71) Applicant: Dell Products L.P., Round Rock, TX (US)

(72) Inventors: John Thomas Cardente, Milford, MA (US); Qi Bao, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 571 days.

(21) Appl. No.: 18/193,801

(22) Filed: Mar. 31, 2023

(65) Prior Publication Data

US 2024/0330751 A1    Oct. 3, 2024

(51) Int. Cl.
| | |
|---|---|
| G06F 15/173 | (2006.01) |
| G06F 7/14 | (2006.01) |
| G06F 16/38 | (2019.01) |
| G06N 20/00 | (2019.01) |

(52) U.S. Cl.
CPC ............... *G06N 20/00* (2019.01); *G06F 7/14* (2013.01); *G06F 16/38* (2019.01)

(58) Field of Classification Search
None
See application file for complete search history.

(56) References Cited

U.S. PATENT DOCUMENTS

| | | |
|---|---|---|
| 2020/0293064 A1 | 9/2020 | Wu et al. |
| 2021/0192418 A1* | 6/2021 | Kishore ................. G06F 40/10 |
| 2022/0012535 A1* | 1/2022 | Ben-Itzhak ......... G06F 18/2148 |
| 2024/0220511 A1* | 7/2024 | Shukla ................. G06F 16/285 |
| 2025/0111159 A1* | 4/2025 | Huang ................... G06F 40/35 |
| 2025/0259078 A1* | 8/2025 | Cohen .................... G06N 3/045 |

FOREIGN PATENT DOCUMENTS

KR    2021154080 A    12/2021

* cited by examiner

*Primary Examiner* — Phuoc H Nguyen
(74) *Attorney, Agent, or Firm* — Chamberlain, Hrdlicka, White, Williams & Aughtry; Aly Z. Dossa

(57) ABSTRACT

Techniques described herein relate to a method for managing training data. The method includes making a determination that the first stream request is associated with unstructured data; in response to the determination: obtaining a manifest associated with the unstructured data based on the stream request, wherein the manifest comprises metadata; loading the unstructured data into a cache using the manifest; merging the metadata with the unstructured data to generate training data, wherein the training data comprises a plurality of training data examples; generating augmented training data using the training data and the stream specification; generating a mini-batch sequence using the augmented training data and the stream specification; creating a mini-batch sequence queue and a stream endpoint; and streaming the mini-batch sequence using the mini-batch sequence queue and the stream endpoint, wherein the mini-batch sequence is used by a training environment to train a machine learning model.

20 Claims, 14 Drawing Sheets

METHOD AND SYSTEM FOR GENERATING MACHINE LEARNING TRAINING DATA STREAMS USING UNSTRUCTURED DATA

BACKGROUND

Computing devices may provide services for users. To provide the services, the computing devices may generate data. The data may be used to generate prediction models. The prediction models may be used to generate predictions. The data may be processed prior to being used to generate prediction models. The data may be transferred from one computing device to another. The data may be unstructured data.

SUMMARY

In general, certain embodiments described herein relate to a method for managing training data. The method may include obtaining a first stream request, wherein the first stream request comprises a stream creation request and a stream specification; in response to obtaining the stream creation request: generating a new stream entry in a stream database; making a determination that the first stream request is associated with unstructured data; in response to the determination: obtaining a manifest associated with the unstructured data based on the stream request, wherein the manifest comprises metadata; loading the unstructured data into a cache using the manifest; merging the metadata with the unstructured data to generate training data, wherein the training data comprises a plurality of training data examples; generating augmented training data using the training data and the stream specification; generating a mini-batch sequence using the augmented training data and the stream specification; creating a mini-batch sequence queue and a stream endpoint; and streaming the mini-batch sequence using the mini-batch sequence queue and the stream endpoint, wherein the mini-batch sequence is used by a training environment to train a machine learning model.

In general, certain embodiments described herein relate to a system for performing data protection of file system data on a host. The system includes a client and a training data stream manager that includes a processor and memory and is programmed to obtain a first stream request from the client, wherein the first stream request comprises a stream creation request and a stream specification; in response to obtaining the stream creation request: generate a new stream entry in a stream database; make a determination that the first stream request is associated with unstructured data; in response to the determination: obtain a manifest associated with the unstructured data based on the stream request, wherein the manifest comprises metadata; load the unstructured data into a cache using the manifest; merge the metadata with the unstructured data to generate training data, wherein the training data comprises a plurality of training data examples; generate augmented training data using the training data and the stream specification; generate a mini-batch sequence using the augmented training data and the stream specification; create a mini-batch sequence queue and a stream endpoint; and stream the mini-batch sequence using the mini-batch sequence queue and the stream endpoint, wherein the mini-batch sequence is used by a training environment to train a machine learning model.

In general, certain embodiments described herein relate to a non-transitory computer readable medium that includes computer readable program code, which when executed by a computer processor enables the computer processor to perform a method for managing training data. The method may include obtaining a first stream request, wherein the first stream request comprises a stream creation request and a stream specification; in response to obtaining the stream creation request: generating a new stream entry in a stream database; making a determination that the first stream request is associated with unstructured data; in response to the determination: obtaining a manifest associated with the unstructured data based on the stream request, wherein the manifest comprises metadata; loading the unstructured data into a cache using the manifest; merging the metadata with the unstructured data to generate training data, wherein the training data comprises a plurality of training data examples; generating augmented training data using the training data and the stream specification; generating a mini-batch sequence using the augmented training data and the stream specification; creating a mini-batch sequence queue and a stream endpoint; and streaming the mini-batch sequence using the mini-batch sequence queue and the stream endpoint, wherein the mini-batch sequence is used by a training environment to train a machine learning model.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for generating and streaming streams of mini-batches of training data examples to a training environment for machine learning training.

Large machine learning models may require substantial amounts of training data-potentially millions of examples and terabytes of data. Training data often may not fit in memory, and re-reading the entire training data set for each epoch may place substantial I/O load on the underlying storage system(s). Training data processing and augmentation may require substantial compute and memory resources above that needed to train models, which may increase the computational burden on the server requirements. Training data processing and augmentation may need to be repeated for each pass over training data (epoch) which may waste resources. Reproducing augmentation and mini-batch ordering may be difficult due to randomization.

Additionally, it may be difficult to coordinate mini-batch generation over parallel training instances when using data parallelism to train large machine learning models. Some solutions may resort to random sampling which may be inefficient and impede reproducibility. Concurrent loading of training data by each parallel instance may further amplify I/O load on underlying storage system. Each parallel instance may perform its own data processing and augmentation resulting in duplicate computations that may waste resources and inflate server computing resource requirements. Similarly, when performing large scale hyper-parameter tuning, each hyper-tuning instance may generate its own mini-batch sequence which, in addition to the above issues, adds a confounding factor when comparing model performances.

To address, at least in part, the aforementioned problems, embodiments disclosed herein relate to a training data stream manager that streams sequenced mini-batches of training data to a training environment for machine learning model training as is discussed in more detail below. As a result, embodiments disclosed herein may support multiple clients to amortize cost of generating training batches, avoid redundant load on data sources, and ensure models are compared using same training inputs. Additionally, embodiments disclosed herein may offload data processing and storage needed to generate training data batch streams, reducing resource requirements for ML training hosts/servers in the training environment. Moreover, pre-staging training data in high-performance backing store may minimize performance IO bottlenecks. Finally, embodiments disclosed herein may enable audibility and reproducibility of training data streams by logging stream information in a log file.

Furthermore, embodiments disclosed herein may enable training data to be generated from unstructured data by merging the unstructured data with metadata associated with the unstructured data. Users may be able to supply their own metadata associated with unstructured data to generate training data, one unstructured data object may be used to generate multiple training data examples, and the unstructured data may not be required to be stored with the metadata. As a result, the flexibility and efficiency of the machine learning training data streaming process may be improved.

FIG. 1A shows a diagram a system in accordance with one or more embodiments disclosed herein. The system may include a client (100), a training data stream manager (TDSM) (110), and a training environment (140). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the client (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (100) described herein and/or all, or a portion, of the methods illustrated in FIGS. 2A-2L. The client (100) may be implemented using other types of computing devices without departing from the embodiments disclosed herein. For additional details regarding computing devices, refer to FIG. 3.

The client (100) may be implemented using logical devices without departing from the embodiments disclosed herein. For example, the client (100) may include virtual machines that utilize computing resources of any number of physical computing devices to provide the functionality of the client (100). The client (100) may be implemented using other types of logical devices without departing from the embodiments disclosed herein.

In one or more embodiments, the client (100) may include the functionality to, or otherwise be programmed or configured to, obtain and/or initiate training data streaming services for users of the client (100) in the training environment (140). To obtain and/or initiate the training data streaming services, the client (100) may include the functionality to send and/or receive information or requests to or from the TDSM (110). The client (100) may include the functionality to perform all, or a portion of, the methods discussed in FIGS. 2A-2L. The client (100) may include other and/or additional functionalities without departing from embodiments disclosed herein. For additional information regarding the functionality of the client (100), refer to FIGS. 2A-2L.

In one or more embodiments, the TDSM (110) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2L. The TDSM (110) may be implemented using other types of computing devices without departing from embodiments disclosed herein. For additional details regarding computing devices, refer to FIG. 3.

In one or more embodiments, the TDSM (110) may be implemented using logical devices without departing from embodiments disclosed herein. For example, the TDSM (110) may include virtual machines that utilize computing resources of any number of physical computing devices to provide the functionality of the TDSM (110). The TDSM (110) may be implemented using other types of logical devices without departing from the embodiments disclosed herein.

In one or more embodiments, the TDSM (110) may include the functionality to, or may be otherwise programmed or configured to, perform training data streaming services for the user of the client (100) and/or the training environment (140). The training data streaming services may include: (i) obtaining and/or collating training data from one or more sources (e.g., the client (100) and/or other entities not shown in FIG. 1A), (ii) processing training data to generate augmented training data, (iii) generating mini-batches using the training data, and (iv) streaming the mini-batches to the training environment (140) using a mini-batch queue. The training data streaming services may include other and/or additional services without departing from embodiments disclosed herein. The TDSM (110) may include other and/or additional functionalities without departing from embodiments disclosed herein. For additional information regarding the TDSM (110) refer to FIG. 1B.

In one or more embodiments, the training environment (140) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2L. The training environment (140) may be implemented using other types of computing devices without departing from embodiments disclosed herein. For additional details regarding computing devices, refer to FIG. 3.

In one or more embodiments, the training environment (140) may be implemented using logical devices without departing from embodiments disclosed herein. For example, the training environment (140) may include virtual machines that utilize computing resources of any number of physical computing devices to provide the functionality of the training environment (140). The training environment (140) may be implemented using other types of logical devices without departing from the embodiments disclosed herein.

In one or more embodiments, the training environment (140) may include the functionality to, or may be otherwise programmed or configured to, perform machine learning model training services. The machine learning model training services may include: (i) obtaining mini-batches of training data from the TDSM (110) and applying a machine learning training algorithm to the obtained training data to train machine learning models. The training environment (140) may use any appropriate machine learning model training algorithms and/or machine learning models without departing from embodiments disclosed herein. The machine learning model training services may include other and/or additional services without departing from embodiments disclosed herein. The training environment (140) may include the functionality to perform all, or a portion, of the methods in FIGS. 2A-2L. The training environment (140) may include other and/or additional functionalities without departing from embodiments disclosed herein.

Although the system of FIG. 1A is shown as having a certain number of components (e.g., 100, 110, 140), in other embodiments disclosed herein, the system may have more or fewer components. For example, the functionality of each component described above may be split across components or combined into a single component. Further still, each component may be utilized multiple times to carry out an iterative operation.

Figure 1B:
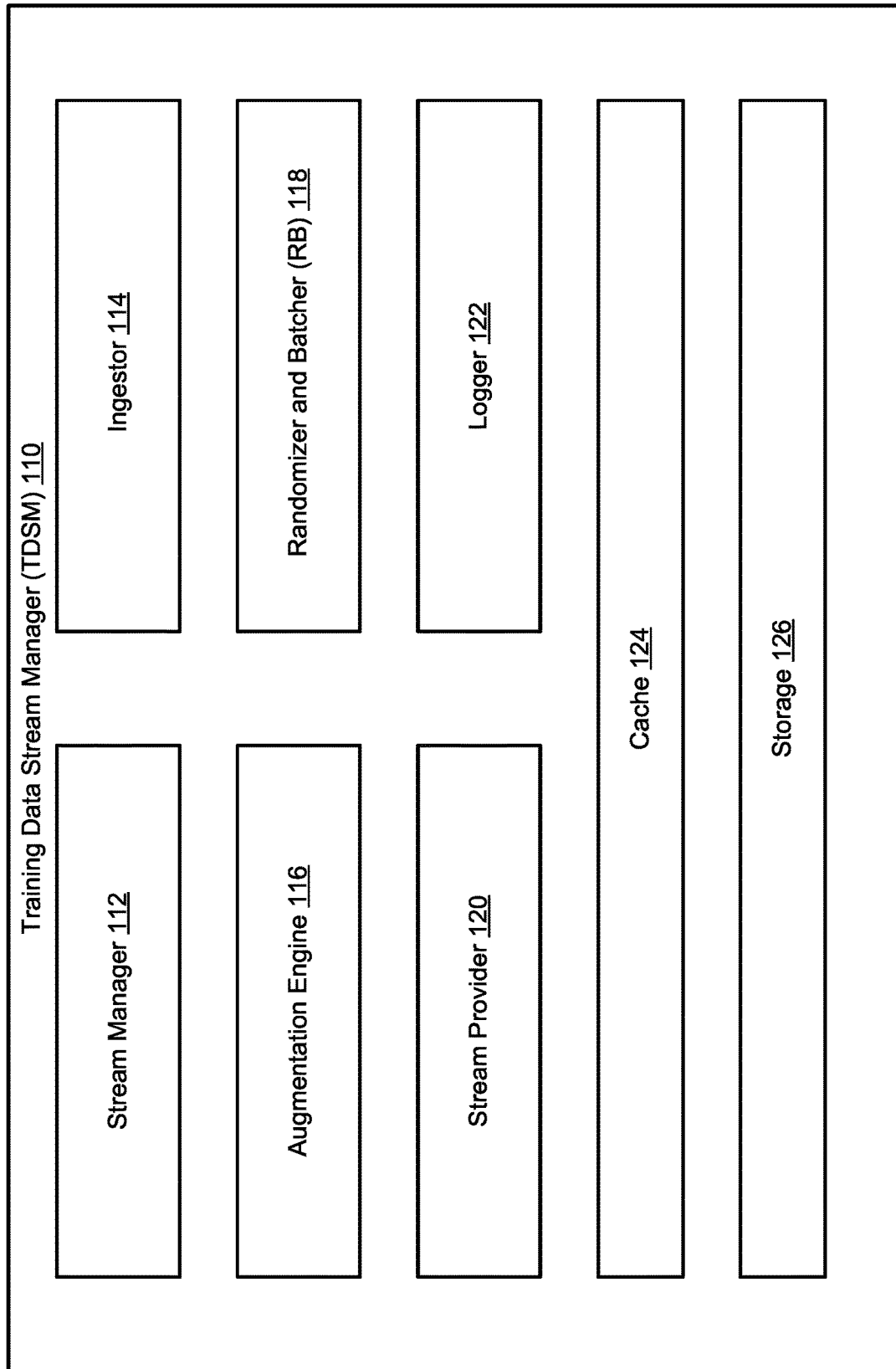
FIG. 1B shows a diagram of a training data stream manager in accordance with one or more embodiments disclosed herein.

FIG. 1B shows a diagram of a training data stream manager (TDSM) (110) in accordance with one or more embodiments disclosed herein. The TDSM (110) may be an embodiment of the TDSM (110, FIG. 1A) discussed above. As discussed above, the TDSM (110) may include the functionality to perform training data streaming services. To perform the aforementioned services, the TDSM (110) may include a stream manager (112), an ingestor (114), an augmentation engine (116), a randomize and batcher (RB) (118), a stream provider (120), a logger (122), a cache (124), and storage (126). The TDSM (110) may include other, additional, and/or fewer components without departing from embodiments disclosed herein. Each of the aforementioned components of the TDSM (110) is discussed below.

In one or more embodiments disclosed herein, the stream manager (112) may be implemented as a physical device.

The physical device may include circuitry. The physical device may be, for example, a field-programmable gate array, application specific integrated circuit, programmable processor, microcontroller, digital signal processor, or other hardware processor. The physical device may be configured to provide the functionality of the stream manager (112) described throughout this Detailed Description.

In one or more embodiments disclosed herein, the stream manager (112) is implemented as computer instructions, e.g., computer code, stored on a storage (e.g., 126) that when executed by a processor of the TDSM (110) causes the TDSM (110) to provide the functionality of the stream manager (112) described throughout this Detailed Description.

In one or more embodiments, the stream manager (112) may include the functionality to perform a portion of the aforementioned training data streaming services of the TDSM (110). The portion of the training data streaming services performed by the stream manager (112) may include (i) obtaining requests (e.g., creation requests, status requests, termination requests, etc.) and stream specifications (both discussed below) associated with training data streams, (ii) maintaining a stream database (discussed below), and (iii) communicating with other TDSM components (e.g., 114, 116, 118, 120, 122, 124, 126) to initiate or otherwise facilitate actions needed to manage training data streams. To perform the portions of the training data streaming services, the stream manager (112) may obtain requests and information from the client (100, FIG. 1A) through an application programming interface (API) and/or a user interface (e.g., web page user interface, a command-line interface, a graphical user interface, etc.), and send information and requests to the client (100) or a user of the client (e.g., stream status information, stream identifiers, etc.). The stream manager (112) may perform all, or a portion, of the methods discussed in FIGS. 2A-2L. The stream manager (112) may include other and/or additional functionalities without departing from embodiments disclosed herein. For additional information regarding the functionality of the stream manager (112), refer to FIGS. 2A-2L.

In one or more embodiments disclosed herein, the ingestor (114) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the ingestor (114) described throughout this Detailed Description.

In one or more embodiments disclosed herein, the ingestor (114) is implemented as computer instructions, e.g., computer code, stored on a storage (e.g., 126) that when executed by a processor of the TDSM (110) causes the TDSM (110) to provide the functionality of the ingestor (114) described throughout this Detailed Description.

In one or more embodiments, the ingestor (114) may include the functionality to perform a portion of the aforementioned training data streaming services of the TDSM (110). The portion of the training data streaming services performed by the ingestor (114) may include (i) obtaining requests from the stream manager (112) to obtain training data from the client (100) and/or other entities not shown in the system of FIG. 1A, (ii) obtaining training data source information from the stream database and then obtaining the training data using the source information, parsing training data to obtain training data examples (discussed below), (iii) loading the training data into the cache (124), and (iv) updating a training example database (discussed below) based on the obtained training data examples. The ingestor (114) may perform all, or a portion, of the methods discussed in FIGS. 2A-2L. The ingestor (114) may include other and/or additional functionalities without departing from embodiments disclosed herein. For additional information regarding the functionality of the ingestor (114), refer to FIGS. 2A-2L.

In one or more embodiments disclosed herein, the augmentation engine (116) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the augmentation engine (116) described throughout this Detailed Description.

In one or more embodiments disclosed herein, the augmentation engine (116) is implemented as computer instructions, e.g., computer code, stored on a storage (e.g., 126) that when executed by a processor of the TDSM (110) causes the TDSM (110) to provide the functionality of the augmentation engine (116) described throughout this Detailed Description.

In one or more embodiments, the augmentation engine (116) may include the functionality to perform a portion of the aforementioned training data streaming services of the TDSM (110). The portion of the training data streaming services performed by the augmentation engine (116) may include (i) obtaining requests from the stream manager (112) to generate augmented training data examples from the training data examples, (ii) selecting training data examples to use to generate augmented training data examples, generating augmented training data examples (discussed below) based on the stream specification, and (iii) querying and updating a training example database (discussed below) based on the augmented training data examples. The augmentation engine (116) may perform all, or a portion, of the methods discussed in FIGS. 2A-2L. The augmentation engine (116) may include other and/or additional functionalities without departing from embodiments disclosed herein. For additional information regarding the functionality of the augmentation engine (116), refer to FIGS. 2A-2L.

In one or more embodiments disclosed herein, the randomizer and batcher (RB) (118) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the RB (118) described throughout this Detailed Description.

In one or more embodiments disclosed herein, the RB (118) is implemented as computer instructions, e.g., computer code, stored on a storage (e.g., 126) that when executed by a processor of the TDSM (110) causes the TDSM (110) to provide the functionality of the RB (118) described throughout this Detailed Description.

In one or more embodiments, the RB (118) may include the functionality to perform a portion of the aforementioned training data streaming services of the TDSM (110). The portion of the training data streaming services performed by the RB (118) may include (i) obtaining requests from the stream manager (112) to generate sequences of mini-batches, (ii) generating a randomized sequence of mini-batches using the training example database and the stream specification, and (iii) updating a mini-batch database (discussed below) based on the generated mini-batch sequences. The RB (118) may perform all, or a portion, of the methods discussed in FIGS. 2A-2L. The RB (118) may include other and/or additional functionalities without departing from embodiments disclosed herein. For additional information regarding the functionality of the RB (118), refer to FIGS. 2A-2L.

In one or more embodiments disclosed herein, the stream provider (120) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the stream provider (120) described throughout this Detailed Description.

In one or more embodiments disclosed herein, the stream provider (120) is implemented as computer instructions, e.g., computer code, stored on a storage (e.g., 126) that when executed by a processor of the TDSM (110) causes the TDSM (110) to provide the functionality of the stream provider (120) described throughout this Detailed Description.

In one or more embodiments, the stream provider (120) may include the functionality to perform a portion of the aforementioned training data streaming services of the TDSM (110). The portion of the training data streaming services performed by the stream provider (120) may include (i) obtaining requests from the stream manager (112) to serve mini-batch sequences to the training environment (140), (ii) obtaining mini-batch sequence entries from the mini-batch database, (iii) generating messages that include the mini-batches of a mini-batch sequence using the corresponding training data examples in the cache (124) and the mini-batch sequence entries, (iv) generating and maintaining mini-batch queues of mini-batch sequence messages, and (v) streaming the mini-batch sequences to one or more entities in the training environment (140, FIG. 1A) using a stream provider API (discussed below). The stream provider (120) may perform all, or a portion, of the methods discussed in FIGS. 2A-2L. The stream provider (120) may include other and/or additional functionalities without departing from embodiments disclosed herein. For additional information regarding the functionality of the stream provider (120), refer to FIGS. 2A-2L.

In one or more embodiments disclosed herein, the logger (122) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the logger (122) described throughout this Detailed Description.

In one or more embodiments disclosed herein, the logger (122) is implemented as computer instructions, e.g., computer code, stored on a storage (e.g., 126) that when executed by a processor of the TDSM (110) causes the TDSM (110) to provide the functionality of the logger (122) described throughout this Detailed Description.

In one or more embodiments, the logger (122) may include the functionality to perform a portion of the aforementioned training data streaming services of the TDSM (110). The portion of the training data streaming services performed by the logger (122) may include (i) obtaining requests from the stream manager (112) to store a log for a mini-batch stream, (ii) obtaining entries from the stream database, the training example database, and the mini-batch database, (iii) storing the obtained entries as a log in a storage (e.g., 126), (iv) obtaining requests from the stream manager (112) to restore a mini-batch stream, (v) obtaining a log associated with the stream from a storage (e.g., 126), and (vi) updating the stream database, the training example database, and the mini-batch database with the appropriate entries. The logger (122) may perform all, or a portion, of the methods discussed in FIGS. 2A-2L. The logger (122) may include other and/or additional functionalities without departing from embodiments disclosed herein. For additional information regarding the functionality of the logger (122), refer to FIGS. 2A-2L.

In one or more embodiments, the cache may refer to one or more hardware storages or portions of hardware storages that store limited amounts of temporary data that may be retrieved faster than data stored on other storages (e.g., 126) such as main memory or secondary storage. The cache (124) may include any quantity of caches without departing from embodiments disclosed herein. The cache (124) may include any appropriate type of cache (e.g., CPU cache, disk cache, flash cache, RAM cache, etc.) without departing from embodiments disclosed herein. The cache (124) may be store a copy of the training data examples while a stream associated with the training data examples exists. The cache (124) may also include a training data example index that may map the training data example identifiers to the corresponding storage locations (e.g., pointers, addresses, etc.) in the cache (124) of the training data examples associated with the training data example identifiers. The cache (124) may include other and/or additional information without departing from embodiments disclosed herein. The cache (124) may be used by the other components of the TDSM (e.g., 112, 114, 116, 118, 120, 122) to perform all or a portion of the training data streaming services.

In one or more embodiments, the cache (124) may include, be operatively connected to, or otherwise be associated with a cache manager (not shown). In one or more embodiments disclosed herein, the cache manager may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the cache manager described throughout this Detailed Description.

In one or more embodiments disclosed herein, the cache manager is implemented as computer instructions, e.g., computer code, stored on a storage (e.g., 126) that when executed by a processor of the TDSM (110) causes the TDSM (110) to provide the functionality of the cache manager described throughout this Detailed Description.

Figure 2A:
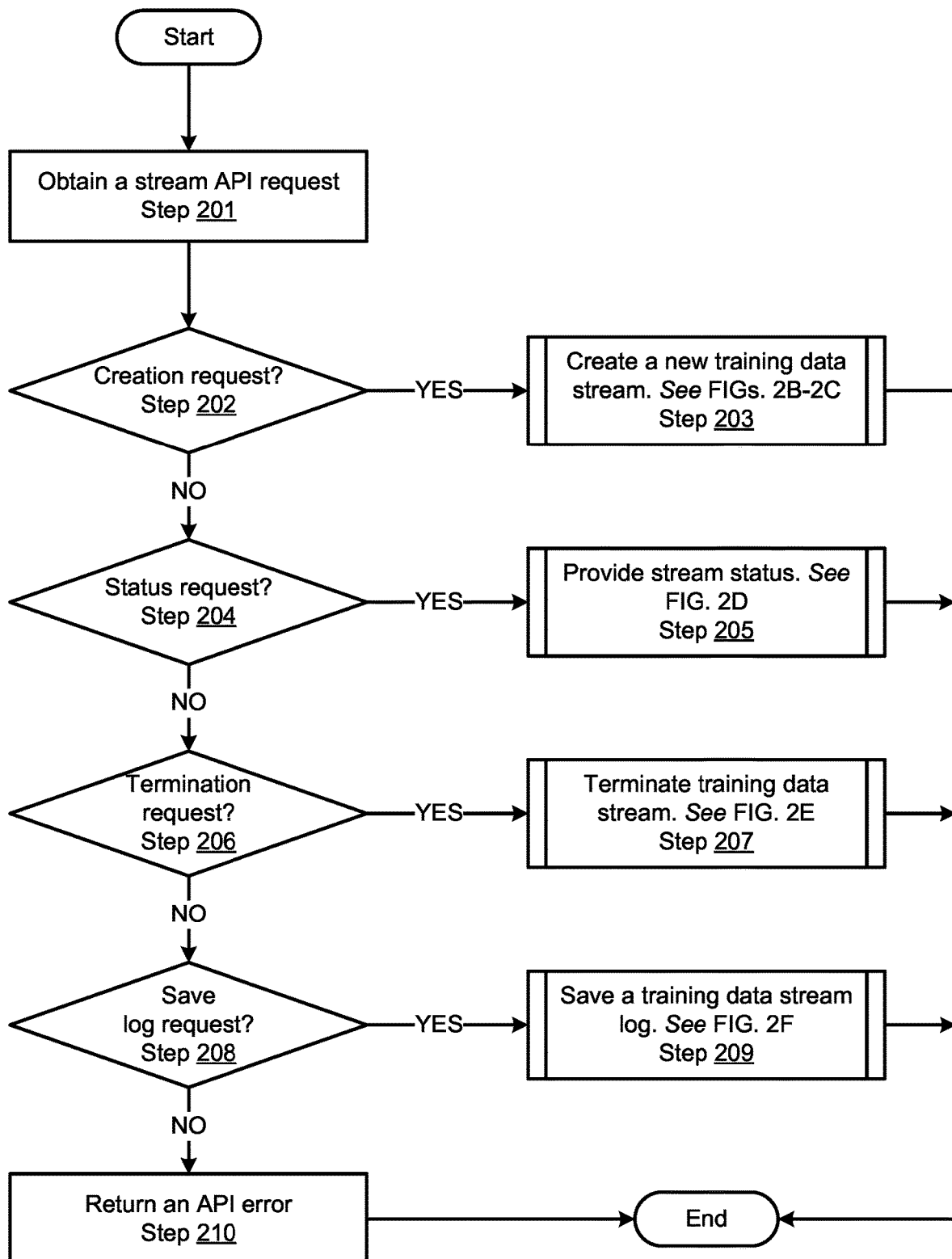
FIG. 2A shows a flowchart of a method for performing training data streaming services in accordance with one or more embodiments disclosed herein.
Figure 2B:
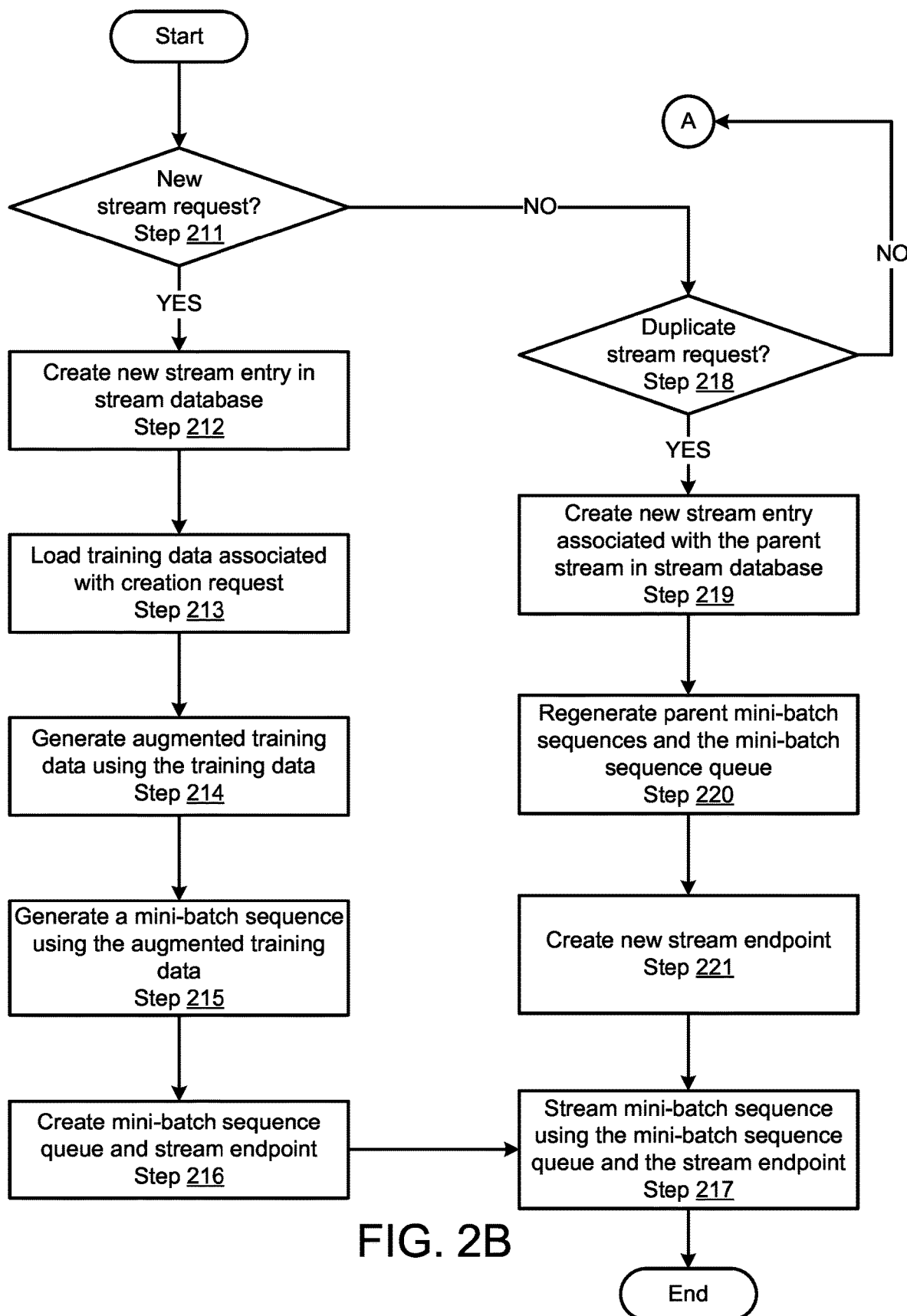
FIGS. 2B-2C show flowcharts of a method for creating a training data stream in accordance with one or more embodiments disclosed herein.
Figure 2C:
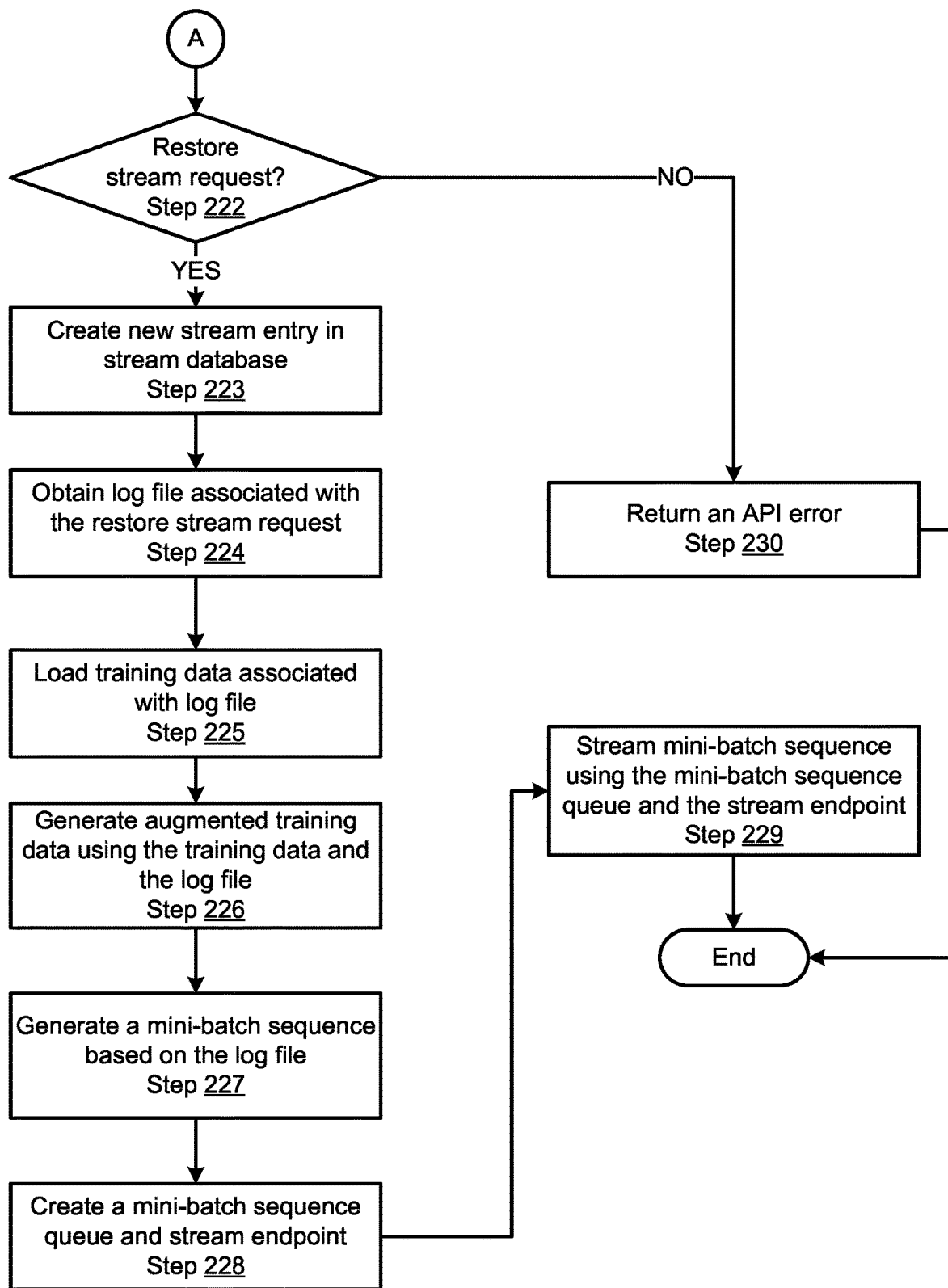
Figure 2D:
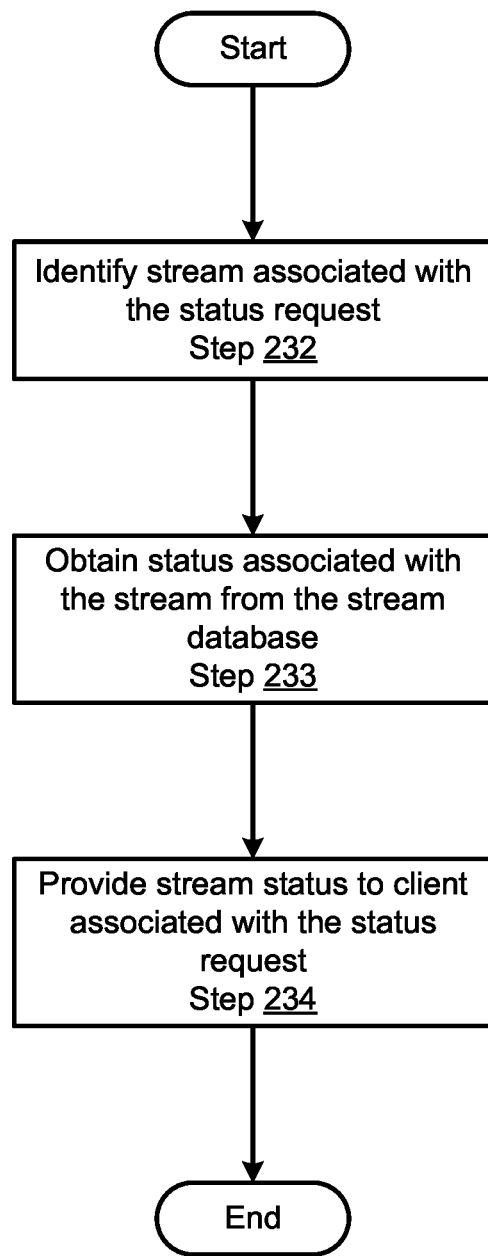
FIG. 2D shows a flowchart of a method for providing a stream status in accordance with one or more embodiments disclosed herein.
Figure 2E:
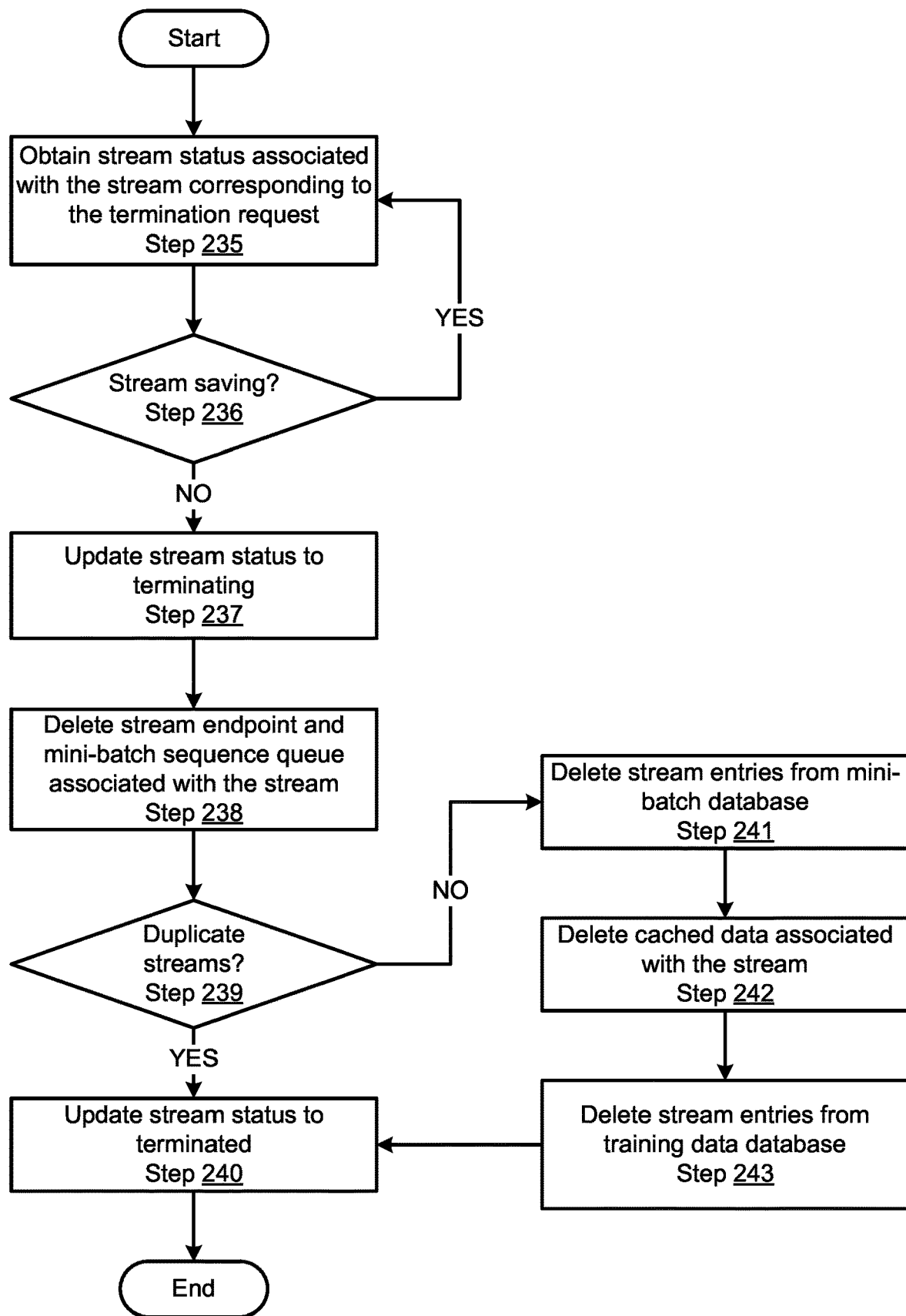
FIG. 2E shows a flowchart of a method for terminating a stream in accordance with one or more embodiments disclosed herein.
Figure 2F:
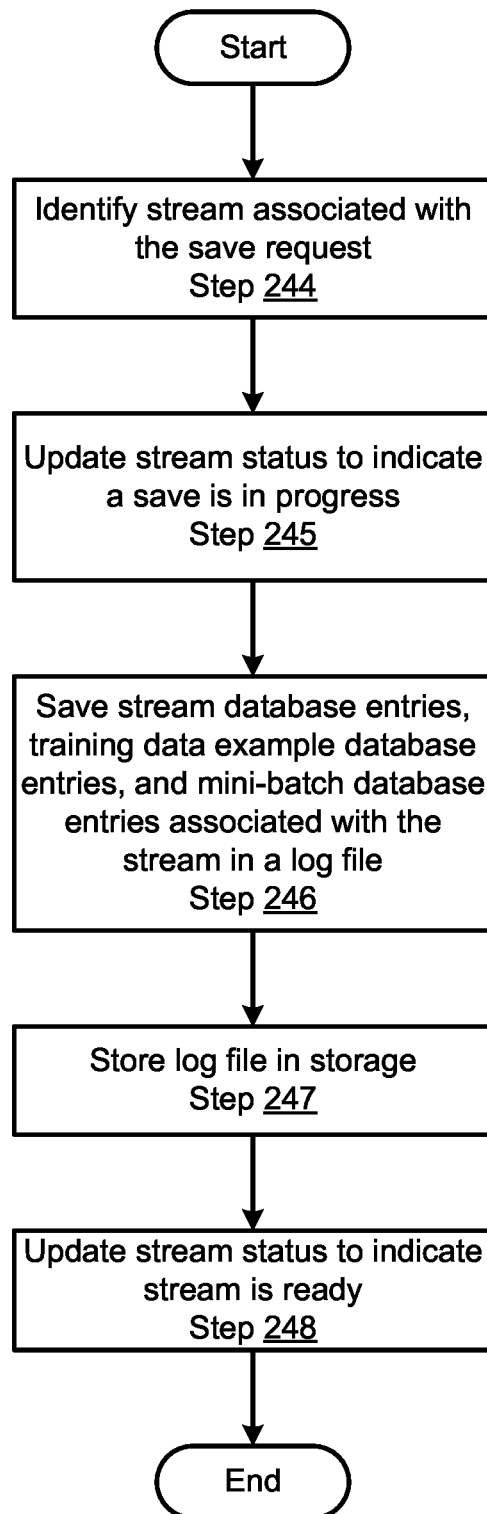
FIG. 2F shows a flowchart of a method for saving a stream in accordance with one or more embodiments disclosed herein.
Figure 2G:
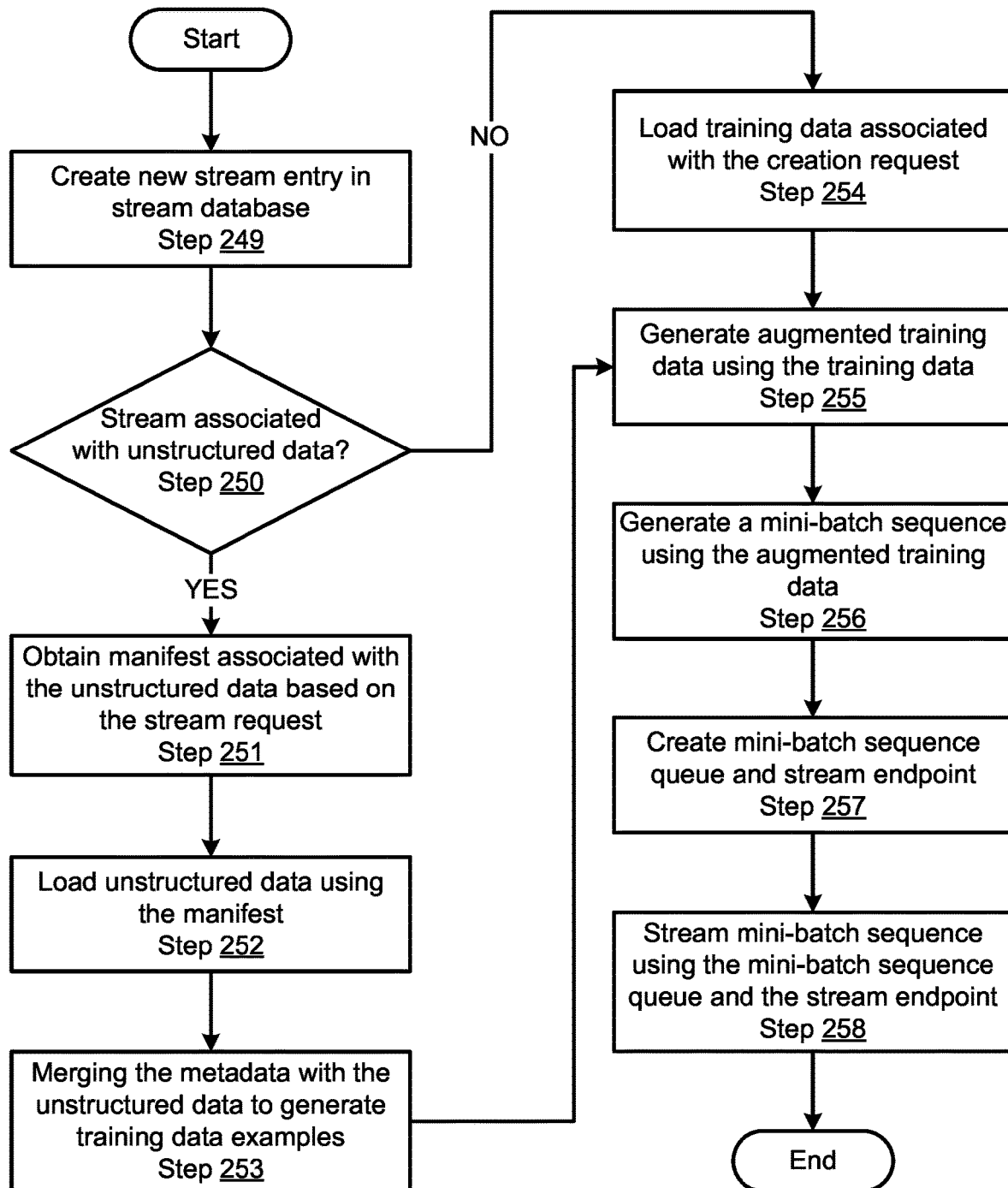
FIG. 2G shows a flowchart of a method for creating a stream with unstructured data in accordance with one or more embodiments disclosed herein.
Figure 2H:
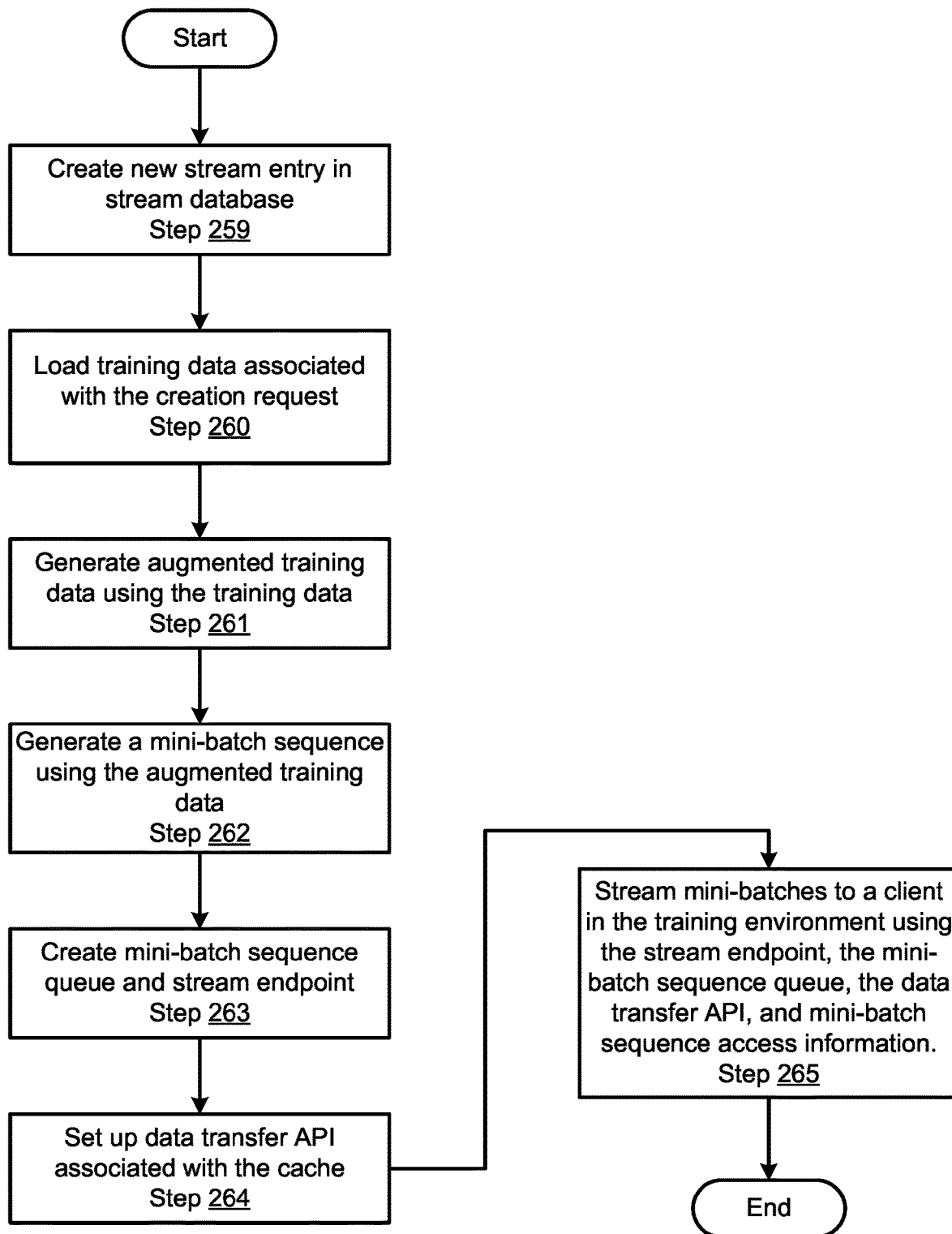
FIG. 2H shows a flowchart of a method for creating a high performance stream in accordance with one or more embodiments disclosed herein.
Figure 2I:
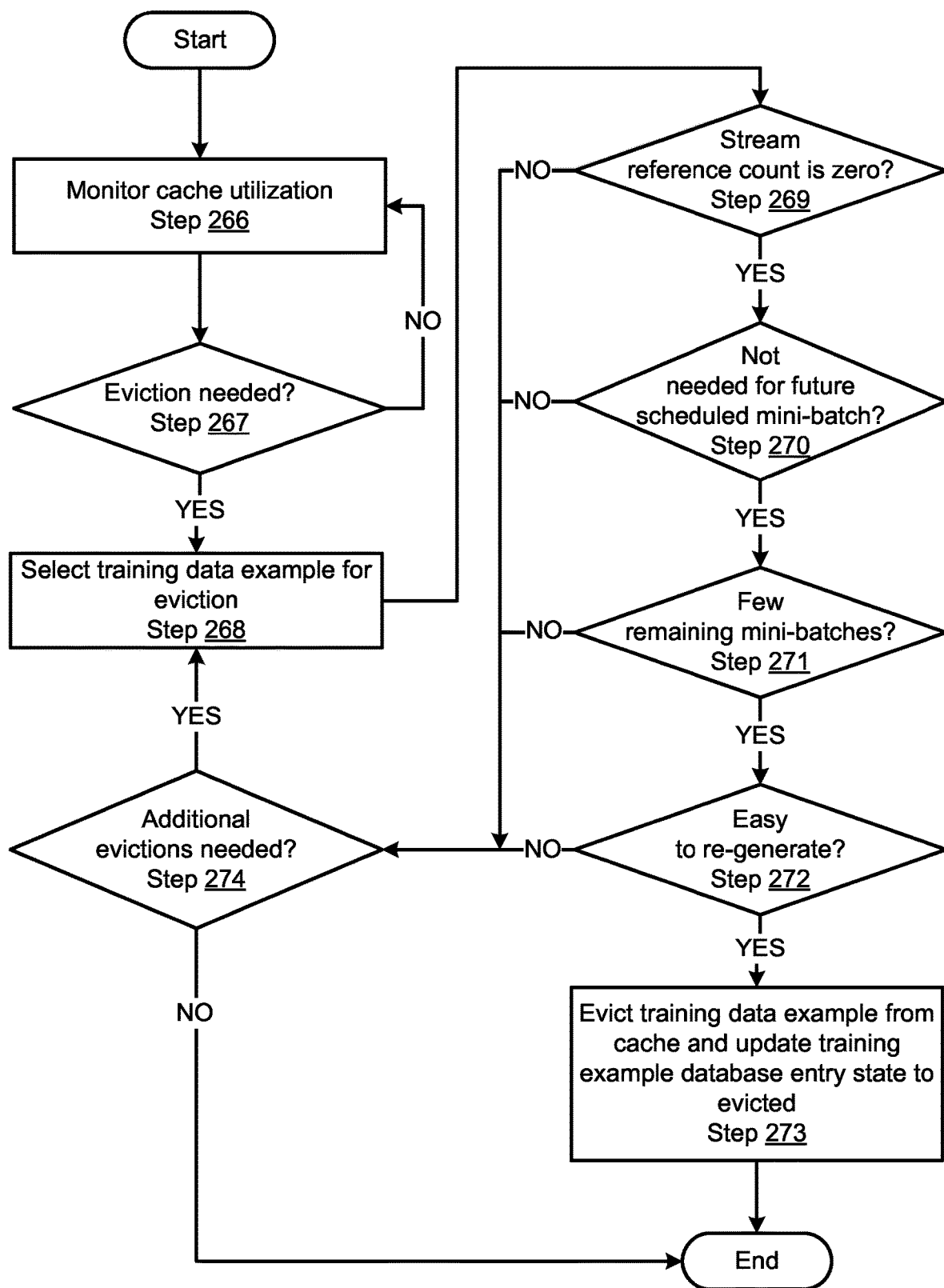
FIG. 2I shows a flowchart of a method for evicting a cache in accordance with one or more embodiments disclosed herein.
Figure 2J:
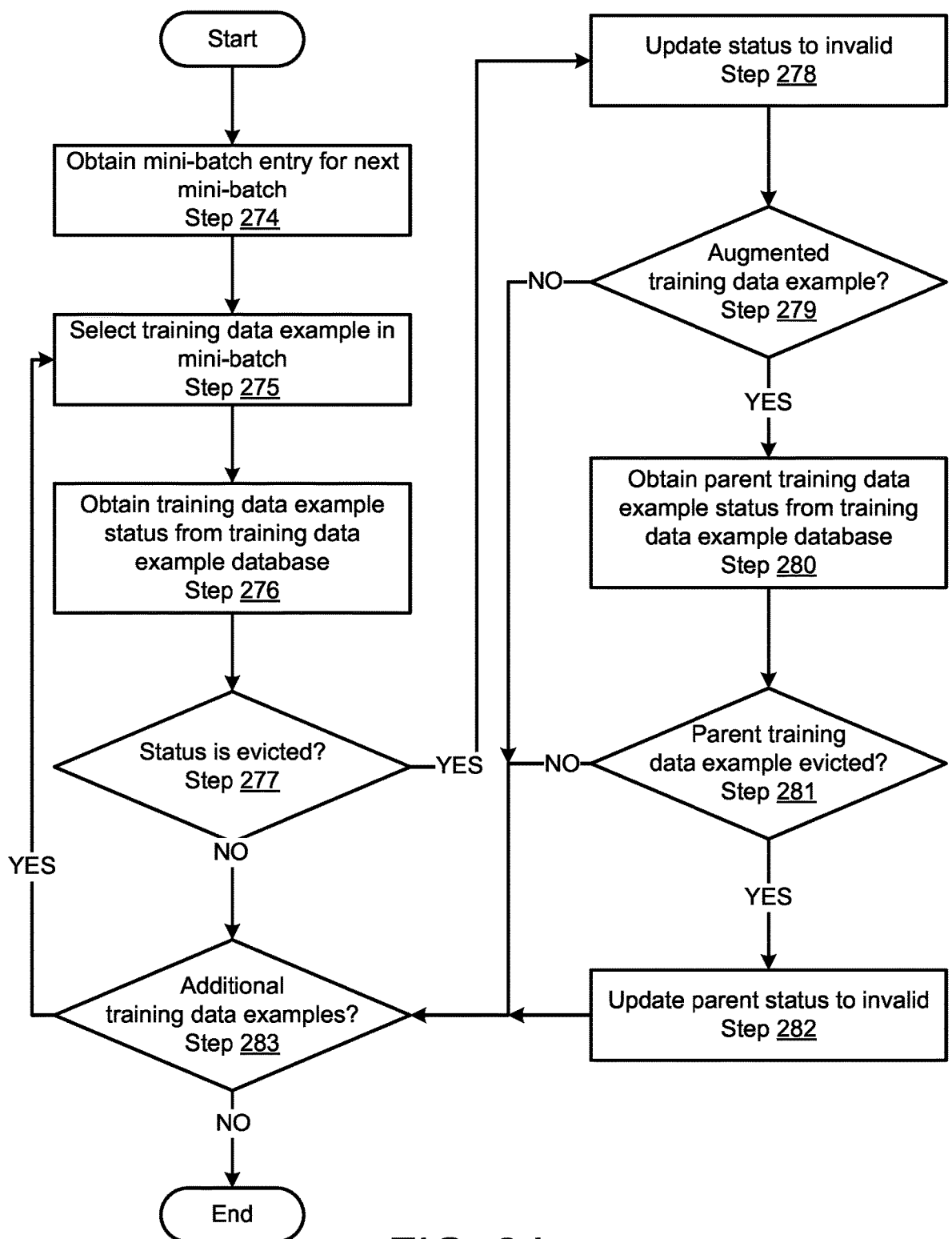
FIG. 2J shows a flowchart of a method for identifying evicted training data examples for reloading in accordance with one or more embodiments disclosed herein.

In one or more embodiments, the cache manager may include the functionality to intelligently evict training data example data from the cache (124) as discussed in FIG. 2J. The cache manager may include other and/or additional functionalities without departing from embodiments disclosed herein. For additional information regarding the functionality of the cache manager, refer to FIG. 2J.

In one or more embodiments, the storage (126) may be implemented using one or more volatile or non-volatile storages or any combination thereof. The storage (126) may include the functionality to, or otherwise be configured to, store and provide all, or portions, of information that may be used by the TDSM components (e.g., 112, 114, 116, 118, 120, 122). The information stored in the storage (126) may include a stream database, a training data example database, mini-batch database, and/or stream logs (all not shown). The storage (126) may include other and/or additional information without departing from embodiments disclosed herein. Each of the aforementioned types of information is discussed below.

In one or more embodiments, the stream database may refer to one or more data structures that include stream database entries. Each stream database entry may be associated with a stream. Each stream database entry may include information associated with the corresponding stream. For example, a stream database entry may include a stream identifier associated with the stream, the stream specification (discussed below) associated with the stream, a parent stream identifier if the stream is a duplicate stream, a stream status, and stream access information. A stream identifier may be a unique combination of bits and/or alphanumeric characters that are associated with and specify a particular stream. The stream status may specify the state of a stream. The stream status may indicate whether the stream is initializing, ready for streaming, saving, is terminating, or has been terminated. The stream status may indicate other and/or additional stream states without departing from embodiments disclosed herein. The stream access information may include the stream identifier, a stream server API endpoint associated with the stream, etc. The stream database entries may include other and/or additional information associated with streams without departing from embodiments disclosed herein.

In one or more embodiments, the stream specification may refer to one or more data structures (e.g., a JavaScript Object Notation (JSON) file, a YAML Ain't Markup Language (YAML) file, a Tom's Obvious Minimal Language (TOML) file, etc.) that include information that may be used by the TDSM to generate a training data stream. The information may include, for example, stream metadata, source information, mini-batch parameters, and/or augmentation parameters. The stream specification may include other and/or additional types of information associated with the stream without departing from embodiments disclosed herein. Each of the aforementioned sets of information included in the stream specification is discussed below.

In one or more embodiments, the stream metadata may include general information associated with the stream. For example, the stream metadata may include a stream name, a stream owner, and a stream description. The stream metadata may be generated and/or provided by a user. The stream metadata may include other and/or additional information associated with the stream without departing from embodiments disclosed herein.

In one or more embodiments, the source information may include information that may be used to obtain training data to generate the training data stream. The source information may include a source type, one or more source access details, and/or one or more query or filtering criteria. The source type may specify the type of entity or entities which include the training data (e.g., relational database, NoSQL database, data lakehouse, object storage bucket, NAS file share, etc.). The source access details may include information that may be used to access and obtain the training data. The source access details may include storage locations (e.g., network addresses, Uniform Resource Locators (URLs), etc.), data locations (e.g., file system paths, buckets, SQL table identifiers, etc.), and/or access credentials (e.g., usernames, passwords, public keys, etc.). The query or filtering criteria may include information that may be used to obtain specific portions of training data (e.g., a target column identifier or a feature name, regex, numeric comparison, etc.). The source information may be generated and/or provided by a user. The source information may include other and/or additional information that may be used to access and obtain the training data without departing from embodiments disclosed herein.

In one or more embodiments, the mini-batch parameters may include information that may be used to generate mini-batches of the training data. The mini-batch parameters may include a mini-batch size (e.g., total data size of the mini-batches, number of training data examples included in the mini-batches, etc.), number of training epochs, and/or a random seed (i.e., to initialize a pseudorandom number generator). The mini-batch parameters may include other and/or additional information associated with the mini-batches without departing from embodiments disclosed herein. The mini-batch parameters may be set, generated, and/or otherwise provided by a user.

In one or more embodiments, the augmentation parameters may specify augmentation operations to perform on the training data to generate augmented training data. The augmentation parameters may include a target column or feature name, the augmentation operation type (e.g., image flip, image rotation, image blurring, audio pitch, random noise, etc.), and/or the augmentation frequency (e.g., every other training data example, every five training data examples, etc.) to perform the augmentation operation(s). The augmentation parameters may include other and/or additional information associated with augmentation operation and augmented training data examples without departing from embodiments disclosed herein. The augmentation parameters may be set, generated, and/or otherwise provided by a user.

In one or more embodiments, the training data example database may refer to one or more data structures that include training data example entries. Each training data example database entry may be associated with a training database example. A training database example may refer to a training data object and the corresponding ground truth label associated with the training data object. A training data object may include any type of data that may serve as an input feature to a machine learning model. A training data object may include images, videos, audio, collections of numerical or textual values, etc. For example, a training data example may include an image file and the correct classification of the image content. Each training data example database entry may include information associated with the corresponding training data example. For example, a training data example database entry may include a training data example identifier associated with the training data example, the stream identifier associated with the training data example, a training data example type that indicates whether the training data example is augmented or not, source information, a parent training data example identifier (if augmented), augmentation information (if augmented), and a training data example status. A training data example identifier may be a unique combination of bits and/or alphanumeric characters that are associated with and specify a particular training data example.

The source information may include any appropriate information associated with sources of the training data example (e.g., file name, table name, client identifier, network address, storage address, etc.) without departing from embodiments disclosed herein. The augmentation information may specify the one or more augmentation operations performed on the parent training data example to generate the augmented training data example. The augmentation operations may include any appropriate augmentation operation (e.g., image flipping, image rotating, audio pitching, etc.) without departing from embodiments disclosed herein. The training data example status may specify the state of a training data example. The training data example status may indicate whether the corresponding training data example is loading, invalid, cached in the cache (124), or evicted from the cache (124). The training data example status may indicate other and/or additional training data example states without departing from embodiments disclosed herein. The training data example database entries may include other and/or additional information associated with training data examples without departing from embodiments disclosed herein.

In one or more embodiments, the mini-batch database may refer to one or more data structures that include mini-batch entries. Each mini-batch entry may be associated with a mini-batch. Each mini-batch entry may include information associated with the corresponding mini-batch. For example, a mini-batch entry may include a mini-batch identifier associated with the mini-batch, the stream identifier associated with the mini-batch, an epoch number associated with the mini-batch, a mini-batch sequence number associated with the mini-batch, and the contents of the mini-batch (e.g., training data example identifiers associated with training data examples that are included in the mini-batch). A mini-batch identifier may be a unique combination of bits and/or alphanumeric characters that are associated with and specify a particular mini-batch. The epoch number may specify the machine learning model training epoch the mini-batch is associated with. The sequence number may specify the position of the mini-batch in the stream for the corresponding training epoch. The mini-batch database entries may include other and/or additional information associated with mini-batches without departing from embodiments disclosed herein.

In one or more embodiments, the stream logs may refer to one or more data structures that include all relevant entries in the stream database, the training data example database, and the mini-batch database associated with a particular stream. The stream logs may be stored and used to restore a terminated stream. The stream logs may be generated by the logger (122) and used by the other TDSM components (e.g., 112, 114, 116, 118, 120) restore a terminated stream. The stream logs may include other and/or additional information associated with streams without departing from embodiments disclosed herein.

While the data structures mentioned in this Detailed Description are discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while discussed as being stored in the storage (126), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

FIG. 2A shows a flowchart of a method for performing training data streaming services in accordance with one or more embodiments disclosed herein. The method shown in FIG. 2A may be performed by, for example, a TDSM (e.g., 110, FIG. 1A) and/or components therein. Other components of the system in FIGS. 1A-1B may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 201, a stream API request is obtained. In one or more embodiments, the supply manager of the TDSM may obtain a stream API request from a client. The client may send the stream API request using any appropriate method of data transmission without departing from embodiments disclosed herein. For example, the stream API request may be obtained by the stream manager as a message that includes one or more network packets through one or more network devices that operatively connect the client to the TDSM. The stream API request may be obtained via other and/or additional methods without departing from embodiments disclosed herein.

In Step 202, a determination is made as to whether the stream API request is a creation request. As discussed above in Step 201, the stream manager of the TDSM may obtain a stream API request. In one or more embodiments, the stream API request may include or otherwise be associated with a request type. For example, the request may include a tag, header information, and/or other indicators that specify the request type associated with the stream API request. In one or more embodiments, the stream manager checks the stream API request to identify a tag, header information, and/or other indicators that specify the request type. In one or more embodiments, if the stream manager identifies a tag, header information, and/or another indicator associated with a creation request, then the stream manager may determine that the stream API request is a creation request. In one or more embodiments, if the stream manager does not identify a tag, header information, and/or another indicator associated with a creation request, then the stream manager may determine that the stream API request is not a creation request. The determination as to whether the stream API request is a creation request may be made via other and/or additional methods without departing from embodiments disclosed herein.

In one or more embodiments, if it is determined that the stream API request is a creation request, then the method proceeds to Step 203. In one or more embodiments, if it is determined that the stream API request is not a creation request, then the method proceeds to Step 204.

In one or more embodiments, request types may include a creation request, a status request, a termination request, and a save request. A creation request may include creating a new stream. A status request may include obtaining a status associated with a stream. A termination request may include terminating a stream. A save request may include saving information associated with a stream for restoration purposes. There may be other and/or additional request types associated with the stream API request without departing from embodiments disclosed herein.

In Step 203, a new training data stream is created. In one or more embodiments, in response to determining that the stream API request is a create request, the TDSM may create a new training data stream. The TDSM may create a new training data stream via the methods discussed below in FIGS. 2B-2C. For additional information regarding the creation of a new training data stream, refer to FIGS. 2B-2C below.

In one or more embodiments disclosed herein, the method ends following Step 203.

In Step 204, a determination is made as to whether the stream request is a status request. As discussed above in Step 201, the stream manager of the TDSM may obtain a stream API request. In one or more embodiments, the stream API request may include or otherwise be associated with a request type. For example, the request may include a tag, header information, and/or other indicators that specify the request type associated with the stream API request. In one or more embodiments, the stream manager checks the stream API request to identify a tag, header information, and/or other indicators that specify the request type. In one or more embodiments, if the stream manager identifies a tag, header information, and/or another indicator associated with a status request, then the stream manager may determine that the stream API request is a status request. In one or more embodiments, if the stream manager does not identify a tag, header information, and/or another indicator associated with a status request, then the stream manager may determine that the stream API request is not a creation request. The determination as to whether the stream API request is a status request may be made via other and/or additional methods without departing from embodiments disclosed herein.

In one or more embodiments disclosed herein, if it is determined that the stream request is a status request, then the method proceeds to Step 205. In one or more embodiments disclosed herein, if it is determined that the stream request is a not status request, then the method proceeds to Step 206.

In Step 205, a stream status is provided. In one or more embodiments, in response to determining that the stream API request is a status request, the TDSM may provide a stream status to the client. The TDSM may provide a stream status to the client via the methods discussed below in FIG. 2D. For additional information regarding providing a stream status, refer to FIG. 2D below.

In one or more embodiments disclosed herein, the method ends following Step 205.

In Step 206, a determination is made as to whether the stream request is a termination request. As discussed above in Step 201, the stream manager of the TDSM may obtain a stream API request. In one or more embodiments, the stream API request may include or otherwise be associated with a request type. For example, the request may include a tag, header information, and/or other indicators that specify the request type associated with the stream API request. In one or more embodiments, the stream manager checks the stream API request to identify a tag, header information, and/or other indicators that specify the request type. In one or more embodiments, if the stream manager identifies a tag, header information, and/or another indicator associated with a termination request, then the stream manager may determine that the stream API request is a termination request. In one or more embodiments, if the stream manager does not identify a tag, header information, and/or another indicator associated with a termination request, then the stream manager may determine that the stream API request is not a creation request. The determination as to whether the stream API request is a termination request may be made via other and/or additional methods without departing from embodiments disclosed herein.

In one or more embodiments disclosed herein, if it is determined that the stream request is a termination request, then the method proceeds to Step 207. In one or more embodiments disclosed herein, if it is determined that the stream request is not a termination request, then the method proceeds to Step 208.

In Step 207, the training data stream is terminated. In one or more embodiments, in response to determining that the stream API request is a termination request, the TDSM may terminate a stream associated with the stream API request. The TDSM may terminate the stream via the methods discussed below in FIG. 2E. For additional information regarding terminating streams, refer to FIG. 2E below.

In one or more embodiments disclosed herein, the method ends following Step 207.

In Step 208, a determination is made as to whether the stream request is a save request. As discussed above in Step 201, the stream manager of the TDSM may obtain a stream API request. In one or more embodiments, the stream API request may include or otherwise be associated with a request type. For example, the request may include a tag, header information, and/or other indicators that specify the request type associated with the stream API request. In one or more embodiments, the stream manager checks the stream API request to identify a tag, header information, and/or other indicators that specify the request type. In one or more embodiments, if the stream manager identifies a tag, header information, and/or another indicator associated with a save request, then the stream manager may determine that the stream API request is a save request. In one or more embodiments, if the stream manager does not identify a tag, header information, and/or another indicator associated with a save request, then the stream manager may determine that the stream API request is not a creation request. The determination as to whether the stream API request is a save request may be made via other and/or additional methods without departing from embodiments disclosed herein.

In one or more embodiments disclosed herein, if it is determined that the stream request is a save request, then the method proceeds to Step 209. In one or more embodiments disclosed herein, if it is determined that the stream request is not a save request, then the method proceeds to Step 210.

In Step 209, a training data stream log is saved. In one or more embodiments, in response to determining that the stream API request is a save request, the TDSM may save a log of the stream associated with the stream API request. The TDSM may save a log of the stream via the methods discussed below in FIG. 2F. For additional information regarding terminating streams, refer to FIG. 2F below.

In one or more embodiments disclosed herein, the method ends following Step 209.

In Step 210, an API error is returned. In one or more embodiments, the stream API request may not include information indicating the request type or may not include correct request type information. In such scenarios, the stream manager may return an API error to the client. The API error may indicate that the request type could not be determined. The API error may include other and/or additional information without departing from embodiments disclosed herein. The API error may be sent to the client using any appropriate method of data transmission without departing from embodiments disclosed herein. For example, the API error may be sent by the stream manager as a message that includes one or more network packets through one or more network devices that operatively connect the client to the TDSM. The API error may be sent via other and/or additional methods without departing from embodiments disclosed herein.

In one or more embodiments disclosed herein, the method ends following Step 210.

FIGS. 2B-2C show a flowchart of a method for creating a training data stream in accordance with one or more embodiments disclosed herein. The method shown in FIG. 2B may be performed by, for example, a TDSM (e.g., 110, FIG. 1A) and/or components therein. Other components of the system in FIGS. 1A-1B may perform all, or a portion, of the method of FIGS. 2B-2C without departing from the scope of the embodiments described herein. While FIGS. 2B-2C is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 211, a determination is made as to whether the creation request is a new stream request. In one or more embodiments, the stream API request may further include or otherwise be associated with a creation request sub-type. For example, the request may include a tag, header information, and/or other indicators (e.g., stream identifier associated with streams to be restored or duplicated, a stream specification, etc.) that specify the creation request sub-type associated with the creation request. In one or more embodiments, the stream manager checks the stream API request to identify a tag, header information, and/or other indicators that specify the creation request sub-type. In one or more embodiments, if the stream manager identifies a tag, header information, and/or another indicator associated with a new stream request, then the stream manager may determine that the creation request is a new stream request. In one or more embodiments, if the stream manager does not identify a tag, header information, and/or another indicator associated with a new stream request, then the stream manager may determine that the stream API request is not a new stream request. The determination as to whether the creation request is a new stream request may be made via other and/or additional methods without departing from embodiments disclosed herein.

In one or more embodiments disclosed herein, if it is determined that the creation request is a new stream request, then the method proceeds to Step 212. In one or more embodiments disclosed herein, if it is determined that the creation request is not a new stream request, then the method proceeds to Step 218.

In one or more embodiments, creation request sub-types may include a new stream request, a duplicate stream request, and a restore stream request. A new stream request may include creating a new stream. A duplicate stream request may include creating a stream that is a duplicate of an existing stream. A restore stream request may include restoring a terminated stream. There may be other and/or additional creation request sub-types associated with the creation request without departing from embodiments disclosed herein.

In Step 212, a new stream entry is created in the stream database. In one or more embodiments, the stream manager may generate a stream identifier associated with the stream. The stream manager may generate a new stream entry in the stream database. The stream entry may include the generated stream identifier associated with the stream. The stream manager may set the stream status in the stream entry to indicate that the stream is initializing (i.e., preparing for streaming). The stream manager may include information that was included in the stream API request in the stream entry such as, for example, a stream specification. After generating the new stream entry in the stream database, stream manager may provide the stream identifier to the client to use for future stream API calls associated with the stream. The new stream entry may be created in the stream database via other and/or additional methods without departing from embodiments disclosed herein.

In Step 213, the training data associated with the creation request is loaded. In one or more embodiments, the new stream request may include a stream specification. As discussed above, the stream specification may include source information that may be used to obtain the training data associated with the creation request. The stream manager may send a request to the ingestor to obtain the training data associated with the stream. The request may include the stream identifier. In response to obtaining the request, the ingestor may obtain the source information from the stream database entry associated with the stream using the stream identifier. The ingestor may then use the source information to read or otherwise obtain the training data from the source. As the ingestor reads the training data, the ingestor may parse the training data to identify individual training data examples. The ingestor may then assign training data example identifiers to the identified training data examples and generate training data example entries associated with the identified training data examples in the training data example database. The ingestor may then store each of the training data examples in the cache. The training data associated with the creation request may be loaded via other and/or additional methods without departing from embodiments disclosed herein.

In Step 214, augmented training data is generated using the training data. In one or more embodiments, the stream manager may request the augmentation engine to perform augmentation operations on the training data examples in the cache. The request may include the stream identifier associated with the stream. In response to obtaining the request, the augmentation engine may obtain the augmentation parameters from the stream specification stored in the stream database entry associated with the stream using the stream identifier. The augmentation engine may iterate over the training data example identifiers associated with the stream and selecting training data example identifiers for augmentation based on the augmentation frequency specified by the augmentation parameters. The augmentation engine may then generate new training data example entries in the training data example database for the to-be generated augmented training data examples. The augmentation engine may set the augmented training data example status to processing. The augmentation engine may query the training data example database for augmented training data examples with the processing status. The augmentation engine may then perform the one or more augmentation operations on the parent training data examples in the cache corresponding to and based on the augmentation training data example entries to generate the augmented training data examples. The augmentation engine may then store the generated augmented training data examples in the cache. The augmented training data may be generated using the training data via other and/or additional methods without departing from embodiments disclosed herein.

In Step 215, a mini-batch sequence is generated using the augmented training data. In one or more embodiments, the stream manager may request the RB to generate mini-batches. The request may include the stream identifier associated with the stream. In response to obtaining the request, the RB may obtain the mini-batch parameters from the stream specification stored in the stream database entry associated with the stream using the stream identifier. The RB may then obtain all training data example identifiers (including augmented training data example identifiers) associated with the stream identifier from the training data example database. The RB may then randomly assign the training data example identifiers to mini-batches and may randomly assign each mini-batch a sequence number based on the mini-batch parameters. The RB may then generate a mini-batch entry associated with each generated mini-batch in the mini-batch database. A mini-batch may refer to a group of training data examples. A mini-batch sequence may refer to an ordered list of mini-batches. The mini-batch sequence may span the entire training process for a targeted machine learning model training as specified by the mini-batch parameters. The mini-batch sequence may be generated using the augmented training data via other and/or additional methods without departing from embodiments disclosed herein.

In Step 216, the mini-batch sequence queue and the stream endpoint are generated. In one or more embodiments, the stream manager may send a request to the stream provider to generate the mini-batch sequence queue and the stream endpoint. The request may include the stream identifier. In one or more embodiments, the stream provider may read each of the mini-batch database entries associated with the stream identifier to obtain the training data example identifiers associated with each mini-batch. The stream provider may then retrieve the training data examples associated with each mini-batch from the cache using the training data example identifiers. The stream provider may combine the training data examples of a mini-batch into a single message and place the message in the mini-batch sequence queue. The stream provider may also inject end-of-epoch and/or end-of-stream markers into the messages when necessary based on the mini-batch entries associated with the mini-batches. The stream provider may add mini-batches to the mini-batch sequence queue based on the sequence number associated with the mini-batch. In other words, mini-batches may be generated and added to the mini-batch sequence queue in sequence order. The mini-batch sequence queue may be, for example, a first-in-first-out (FIFO) queue that includes messages comprising the training data examples of mini-batches to be streamed to the training environment. The stream provider may then instantiate, generate, and/or otherwise provide a stream server API endpoint that one or more clients of the training environment may use to retrieve the mini-batches in the mini-batch sequence queue. The mini-batch sequence queue and the stream endpoint may be generated via other and/or additional methods without departing from embodiments disclosed herein.

In Step 217, the mini-batch sequences are streamed using the mini-batch sequence queue and the stream endpoint. As discussed above, the stream provider may provide a stream server API endpoint to one or more clients of the training environment that may be used to retrieve the mini-batches in the mini-batch sequence queue. The stream provider may provide other information (e.g., the stream identifier and/or access credentials such as encryption keys, public keys, passwords, etc.) that the clients of the training environment may use to retrieve the mini-batches. In one or more embodiments, the clients of the training environment may submit requests (e.g., stream server API requests) for the next mini-batch in the mini-batch sequence queue. In response to obtaining the request, the stream provider, may, through the stream server API endpoint, provide the next mini-batch in the mini-batch sequence queue to the client of the training environment. In one or more embodiments, once a mini-batch is streamed to the training environment, the mini-batch may be removed from the mini-batch sequence queue.

In one or more embodiments, the mini-batch sequence queue may only include a portion of the mini-batches included in the mini-batch sequence. In such scenarios, the stream provider may repeat the methods of Step 216 or Step 220 to generate and add more mini-batches to the mini-batch sequence queue until all mini-batches in the mini-batch sequence are streamed. In one or more embodiments, the stream provider may generate and load mini-batches into the mini-batch sequence queue at the same rate that the mini-batches are streamed to the training environment. For example, when a mini-batch is streamed and removed from the mini-batch sequence queue, the stream provider may generate and add the next mini-batch in the mini-batch sequence to the mini-batch sequence queue. As the client of the training environment obtain the mini-batches from the TDSM, the client may apply a machine learning training algorithm to the mini-batches to train a machine learning prediction model.

In one or more embodiments, the stream may be duplicated any number of times and sent to other clients in the training environment. In such scenarios, each duplicate stream may include its own mini-batch sequence queue, that while streaming the same mini-batch sequence as the parent stream and other duplicates of the parent stream, may be streamed independently of each other. For example, the parent stream may be streamed in a lesser amount of time while a duplicate stream may be streamed in a longer amount of time. As a result, streams may not be delayed based on throughput issues associated with other streams.

The mini-batch sequences may be streamed using the mini-batch sequence queue and the stream endpoint via other and/or additional methods without departing from embodiments disclosed herein.

In one or more embodiments disclosed herein, the method ends following Step 217.

In Step 218, a determination is made as to whether the creation request is a duplicate stream request. In one or more embodiments, the stream API request may further include or otherwise be associated with a creation request sub-type. For example, the request may include a tag, header information, and/or other indicators (e.g., stream identifier associated with streams to be restored or duplicated, a stream specification, etc.) that specify the creation request sub-type associated with the creation request. In one or more embodiments, the stream manager checks the stream API request to identify a tag, header information, and/or other indicators that specify the creation request sub-type. In one or more embodiments, if the stream manager identifies a tag, header information, and/or another indicator associated with a duplicate stream request, then the stream manager may determine that the creation request is a duplicate stream request. In one or more embodiments, if the stream manager does not identify a tag, header information, and/or another indicator associated with a duplicate stream request, then the stream manager may determine that the stream API request is not a duplicate stream request. The determination as to whether the creation request is a duplicate request may be made via other and/or additional methods without departing from embodiments disclosed herein.

In one or more embodiments disclosed herein, if it is determined that the creation request is a duplicate stream request, then the method proceeds to Step 219. In one or more embodiments disclosed herein, if it is determined that the creation request is not a duplicate stream request, then the method proceeds to Step 222 of FIG. 2C.

In Step 219, a new stream entry associated with the parent stream is created in the stream database. In one or more embodiments, the stream manager may generate a stream identifier associated with the stream. The stream manager may generate a new stream entry in the stream database. The stream entry may further include the generated stream identifier associated with the stream and the stream identifier associated with the parent stream. The stream manager may set the stream status in the stream entry to indicate that the stream is initializing (i.e., preparing for streaming). The stream manager may include information that was included in the stream API request in the stream entry such as, for example, a stream specification. After generating the new stream entry in the stream database, stream manager may provide the stream identifier to the client to use for future stream API calls associated with the stream. The new stream entry associated with the parent stream may be created in the stream database via other and/or additional methods without departing from embodiments disclosed herein.

In Step 220, the parent mini-batch sequences and the mini-batch sequence queue are regenerated. In one or more embodiments, the stream manager may send a request to the RB to regenerate the mini-batch sequence. The request may include the stream identifier and the parent stream identifier. In response to obtaining the request, the RB may obtain the mini-batch entries in the mini-batch database associated with the parent stream using the parent stream identifier. The RB may then generate new mini-batch database entries that are copies of the mini-batch database entries associated with the parent stream identifier that include the new stream identifier.

In one or more embodiments, the stream manager may then send a request to the stream provider to regenerate the mini-batch sequence queue. The request may include the stream identifier. In one or more embodiments, the stream provider may read each of the mini-batch database entries associated with the stream identifier to obtain the training data example identifiers associated with each mini-batch. The stream provider may then retrieve the training data examples associated with each mini-batch from the cache using the training data example identifiers. The stream provider may combine the training data examples of a mini-batch into a single message and place the message in the mini-batch sequence queue. The stream provider may also inject end-of-epoch and/or end-of-stream markers into the messages when necessary based on the mini-batch entries associated with the mini-batches. The stream provider may add mini-batches to the mini-batch sequence queue based on the sequence number associated with the mini-batch. In other words, mini-batches may be generated and added to the mini-batch sequence queue in sequence order. The mini-batch sequence queue may be, for example, a first-in-first-out (FIFO) queue that includes messages comprising the training data examples of mini-batches to be streamed to the training environment. The parent mini-batch sequences and the mini-batch sequence queue may be regenerated via other and/or additional methods without departing from embodiments disclosed herein.

In Step 221, a new stream endpoint is created. The stream provider may then instantiate, generate, and/or otherwise provide a stream server API endpoint associated with the duplicate stream that one or more clients of the training environment may use to retrieve the mini-batches in the mini-batch sequence queue associated with the duplicate stream. As a result, the duplicate stream may be an exact copy of the parent stream, with the exact same mini-batches and mini-batch sequence. The new stream endpoint may be created via other and/or additional methods without departing from embodiments disclosed herein.

In one or more embodiments disclosed herein, the method proceeds to Step 217 following Step 221.

Turning to FIG. 2C, in Step 222, a determination is made as to whether the creation request is a restore stream request. In one or more embodiments, the stream API request may further include or otherwise be associated with a creation request sub-type. For example, the request may include a tag, header information, and/or other indicators (e.g., stream identifier associated with streams to be restored or duplicated, a stream specification, etc.) that specify the creation request sub-type associated with the creation request. In one or more embodiments, the stream manager checks the stream API request to identify a tag, header information, and/or other indicators that specify the creation request sub-type. In one or more embodiments, if the stream manager identifies a tag, header information, and/or another indicator associated with a restore stream request, then the stream manager may determine that the creation request is a restore stream request. In one or more embodiments, if the stream manager does not identify a tag, header information, and/or another indicator associated with a restore stream request, then the stream manager may determine that the stream API request is not a restore stream request. The determination as to whether the creation request is a restore stream request may be made via other and/or additional methods without departing from embodiments disclosed herein.

In one or more embodiments disclosed herein, if it is determined that the creation request is a restore stream request, then the method proceeds to Step 223. In one or more embodiments disclosed herein, if it is determined that the creation request is not a restore stream request, then the method proceeds to Step 231.

In Step 223, a new stream entry is created in the stream database. In one or more embodiments, the stream manager may generate a new stream entry in the stream database. The stream entry may include the generated stream identifier associated with the stream. The stream manager may set the stream status in the stream entry to indicate that the stream is initializing (i.e., preparing for streaming). The new stream entry may be created in the stream database via other and/or additional methods without departing from embodiments disclosed herein.

In Step 224, a log file associated with the restore stream request may be obtained. In one or more embodiments, the restore stream request may include a stream identifier associated with the stream that is to be restored. In one or more embodiments, the stream manager may request the logger to obtain a log file associated with the stream corresponding to the stream identifier in the restore stream request. In response to obtaining the request, the logger may read or otherwise obtain the log file associated with the stream identifier from the storage of the TDSM or another storage entity. After obtaining the log file, the logger may write the stream database entry contents into the newly generated stream database entry. The logger may also write the training data example database entries and the mini-batch database entries included in the log file to the respective databases as new entries. If necessary, the logger may change identifiers (e.g., training data example identifiers, mini-batch identifiers, etc.) to avoid collisions with active mini-batch streams. In one or more embodiments, the log file associated with the restore stream request may be obtained via other and/or additional methods without departing from embodiments disclosed herein.

In Step 225, the training data associated with the log file may be loaded. As discussed above, the stream database entry contents from the log file may be written to the newly generated stream database entry. In one or more embodiments, the stream manager may send a request to the ingestor to obtain the training data associated with the log file using the stream identifier. The request may include the stream identifier. In response to obtaining the request, the ingestor may obtain the source information from the stream database entry associated with the stream using the stream identifier. The ingestor may then use the source information to read or otherwise obtain the training data from the source. The ingestor may then store each of the training data examples in the cache. The training data associated with the log file may be loaded via other and/or additional methods without departing from embodiments disclosed herein.

In Step 226, augmented training data is generated using the training data and the log file. As discussed above, the logger may have written the training data example entries included in the log file to the training data example database. The stream manager may instruct the augmentation engine to regenerate the augmented training data examples associated with the stream using the stream identifier. In response to obtaining the request, the augmentation engine may set the augmented training data example status of the augmented training data example entries associated with the stream all to processing. The augmentation engine may query the training data example database for augmented training data examples with the processing status. The augmentation engine may then perform the one or more augmentation operations on the parent training data examples in the cache corresponding to and based on the augmentation training data example entries to generate the augmented training data examples. The augmentation engine may then store the generated augmented training data examples in the cache. The augmented training data may be generated using the training data and the log file via other and/or additional methods without departing from embodiments disclosed herein.

In Step 227, a mini-batch sequence is generated based on the log file. As discussed above, the logger may have written the mini-batch entries included in the log file to the mini-batch database. Accordingly, the mini-batches sequence may be included in mini-batch entries in the mini-batch database and may be used for streaming as discussed below. The mini-batch sequence may be generated based on the log file via other and/or additional methods without departing from embodiments disclosed herein.

In Step 228, a mini-batch sequence queue and a stream endpoint are generated. In one or more embodiments, the stream manager may send a request to the stream provider to generate the mini-batch sequence queue and the stream endpoint. The request may include the stream identifier. In one or more embodiments, the stream provider may read each of the mini-batch database entries associated with the stream identifier to obtain the training data example identifiers associated with each mini-batch. The stream provider may then retrieve the training data examples associated with each mini-batch from the cache using the training data example identifiers. The stream provider may combine the training data examples of a mini-batch into a single message and place the message in the mini-batch sequence queue. The stream provider may also inject end-of-epoch and/or end-of-stream markers into the messages when necessary based on the mini-batch entries associated with the mini-batches. The stream provider may add mini-batches to the mini-batch sequence queue based on the sequence number associated with the mini-batch. In other words, mini-batches may be generated and added to the mini-batch sequence queue in sequence order. The mini-batch sequence queue may be, for example, a first-in-first-out (FIFO) queue that includes messages comprising the training data examples of mini-batches to be streamed to the training environment. The stream provider may then instantiate, generate, and/or otherwise provide a stream server API endpoint that one or more clients of the training environment may use to retrieve the mini-batches in the mini-batch sequence queue. The mini-batch sequence queue and the stream endpoint may be generated via other and/or additional methods without departing from embodiments disclosed herein.

In Step 229, the mini-batch sequence is streamed using the mini-batch sequence queue and the stream endpoint. As discussed above, the stream provider may provide a stream server API endpoint to one or more clients of the training environment that may be used to retrieve the mini-batches in the mini-batch sequence queue. The stream provider may provide other information (e.g., the stream identifier and/or access credentials such as encryption keys, public keys, passwords, etc.) that the clients of the training environment may use to retrieve the mini-batches. In one or more embodiments, the clients of the training environment may submit requests (e.g., stream server API requests) for the next mini-batch in the mini-batch sequence queue. In response to obtaining the request, the stream provider, may, through the stream server API endpoint, provide the next mini-batch in the mini-batch sequence queue to the client of the training environment. In one or more embodiments, once a mini-batch is streamed to the training environment, the mini-batch may be removed from the mini-batch sequence queue.

In one or more embodiments, the mini-batch sequence queue may only include a portion of the mini-batches included in the mini-batch sequence. In such scenarios, the stream provider may repeat the methods of Step 229 to generate and add more mini-batches to the mini-batch sequence queue until all mini-batches in the mini-batch sequence are streamed. In one or more embodiments, the stream provider may generate and load mini-batches into the mini-batch sequence queue at the same rate that the mini-batches are streamed to the training environment. For example, when a mini-batch is streamed and removed from the mini-batch sequence queue, the stream provider may generate and add the next mini-batch in the mini-batch sequence to the mini-batch sequence queue. As the client of the training environment obtains the mini-batches from the TDSM, the client may apply a machine learning training algorithm to the mini-batches to train a machine learning prediction model.

As a result, performing Steps 222-230 may enable the TDSM to restore a training data stream that has been previously terminated and stream the restored stream exactly as it was streamed before.

In one or more embodiments disclosed herein, the method ends following Step 229.

In Step 230, an API error is returned. In one or more embodiments, the stream API request may not include information indicating the creation request sub-type or may not include correct request type information. In such scenarios, the stream manager may return an API error to the client. The API error may indicate that the request creation type could not be determined. The API error may include other and/or additional information without departing from embodiments disclosed herein. The API error may be sent to the client using any appropriate method of data transmission without departing from embodiments disclosed herein. For example, the API error may be sent by the stream manager as a message that includes one or more network packets through one or more network devices that operatively connect the client to the TDSM. The API error may be sent via other and/or additional methods without departing from embodiments disclosed herein.

In one or more embodiments disclosed herein, the method ends following Step 230.

FIG. 2D shows a flowchart of a method for providing a stream status in accordance with one or more embodiments disclosed herein. The method shown in FIG. 2D may be performed by, for example, a TDSM (e.g., 110, FIG. 1A) and/or components therein. Other components of the system in FIGS. 1A-1B may perform all, or a portion, of the method of FIG. 2D without departing from the scope of the embodiments described herein. While FIG. 2D is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 232, a stream associated with the status request is identified. In one or more embodiments, the status request may include a stream identifier associated with the stream that is the target of the status request. In one or more embodiments, the stream manager may use the stream identifier included in the status request to identify the stream associated with the status request. The stream identifier included in the status request may be matched with a stream identifier included in a stream entry of the stream database to identify the stream associated with the status request. The stream associated with the status request may be identified via other and/or additional methods without departing from embodiments disclosed herein.

In Step 233, a status associated with the stream is obtained from the stream database. As discussed above, the stream database entry associated with the stream may include a stream status. The stream status may specify the state of a stream. The stream status may indicate whether the stream is initializing, ready for streaming, saving, is terminating, or has been terminated. The stream status may indicate other and/or additional stream states without departing from embodiments disclosed herein. In one or more embodiments, the stream manager may read or otherwise obtain the current stream status associated with the stream from the corresponding stream database entry associated with the stream. The status associated with the stream may be obtained from the stream database via other and/or additional methods without departing from embodiments disclosed herein.

In Step 234, the stream status is provided to the client associated with the status request. In one or more embodiments, the stream manager may return the stream status to the client. The stream status may indicate the current state of the stream associated with the stream status. The stream status may include other and/or additional information without departing from embodiments disclosed herein. The stream status may be sent to the client using any appropriate method of data transmission without departing from embodiments disclosed herein. For example, the stream status may be sent by the stream manager as a message that includes one or more network packets through one or more network devices that operatively connect the client to the TDSM. The stream status may be provided to the client associated with the status request via other and/or additional methods without departing from embodiments disclosed herein.

In one or more embodiments disclosed herein, the method ends following Step 234.

In one or more embodiments, the methods of FIG. 2D enable a client and/or users of the client to obtain a status of a stream of the TDSM. The client and/or users of the client may send additional requests associated with the stream to the TDSM based on the obtained stream status. As a result, the client and/or users of the client may include knowledge of the state of the stream and may intelligently generate subsequent requests associated with the stream based on the stream status, thereby increasing the efficiency of the system.

FIG. 2E shows a flowchart of a method for terminating a stream in accordance with one or more embodiments disclosed herein. The method shown in FIG. 2E may be performed by, for example, a TDSM (e.g., 110, FIG. 1A) and/or components therein. Other components of the system in FIGS. 1A-1B may perform all, or a portion, of the method of FIG. 2E without departing from the scope of the embodiments described herein. While FIG. 2E is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 235, the stream status associated with the stream corresponding to the termination request is obtained. In one or more embodiments, the status request may include a stream identifier associated with the stream that is the target of the status request. In one or more embodiments, the stream manager may use the stream identifier included in the status request to identify the stream associated with the status request. The stream identifier included in the status request may be matched with a stream identifier included in a stream entry of the stream database to identify the stream associated with the status request. As discussed above, the stream database entry associated with the stream may include a stream status. The stream status may specify the state of a stream. In one or more embodiments, the stream manager may read or otherwise obtain the current stream status associated with the stream from the corresponding stream database entry associated with the stream. The status associated with the stream may be obtained from the stream database via other and/or additional methods without departing from embodiments disclosed herein.

In Step 236, a determination is made as to whether the stream is currently being saved. As discussed above, the stream status may specify the current state of the stream. In one or more embodiments, the stream manager may check the stream status to determine whether it specifies that the stream is currently being saved. In one or more embodiments, if the stream state indicates that the stream is currently being saved, then the stream manager may determine that the stream is currently being saved. In one or more embodiments, if the stream state indicates that the stream is not currently being saved, then the stream manager may determine that the stream is not currently being saved. The determination as to whether the stream is currently being saved may be made via other and/or additional methods without departing from embodiments disclosed herein.

In one or more embodiments disclosed herein, if it is determined that the stream is currently being saved, then the method proceeds to Step 235 (i.e., the stream manager may wait until the stream is not currently being saved). In one or more embodiments disclosed herein, if it is determined that the stream is not currently being saved, then the method proceeds to Step 237.

In Step 237, the stream status is updated to terminating. In one or more embodiments, the stream manager may update the stream status associated with the stream in the stream database entry to indicate that the stream is terminating. The stream manager may overwrite the previous stream status with information that indicates that the stream is terminating. For example, the stream manager may set a terminating bit, write the string "terminating", or include some other information in the stream status that may indicate that the stream is terminating without departing from embodiments disclosed herein. The stream status may be updated to terminating via other and/or additional methods without departing from embodiments disclosed herein.

In Step 238, the stream endpoint and the mini-batch sequence queue associated with the stream are deleted. In one or more embodiments, the stream manager may send a request to delete the stream endpoint and the mini-batch sequence queue associated with the stream to the stream provider. The request may include the stream identifier associated with the stream. In one or more embodiments, in response to obtaining the request, the stream provider may delete the mini-batch sequence queue associated with the stream identifier corresponding to the stream. The stream provider may also delete the stream server API endpoint associated with the stream identifier. The stream provider may include or otherwise have access to a mapping of stream identifiers and mini-batch sequence queues and stream server API endpoints associated with the stream identifiers. The stream endpoint and the mini-batch sequence queue associated with the stream may be deleted via other and/or additional methods without departing from embodiments disclosed herein.

In Step 239, a determination is made as to whether the stream is associated with duplicate streams. As discussed above, the stream database entries of duplicate streams may include parent stream identifiers associated with original parent streams of which the duplicate streams are duplicative. In one or more embodiments, the stream manager may query the stream database entries to identify parent stream identifiers that match the stream identifier of the terminating stream. In other words, the stream manager may identify duplicate streams of the terminating stream. In one or more embodiments, if the stream identifier of the terminating stream matches a parent stream identifier in another stream database entry (i.e., there is a duplicate stream of the terminating stream), then the stream manager may determine that the stream is associated with duplicate streams. In one or more embodiments, if the stream identifier of the terminating stream does not match a parent stream identifier in another stream database entry (i.e., there is no duplicate stream of the terminating stream), then the stream manager may determine that the stream is not associated with duplicate streams. The determination as to whether the stream is associated with duplicate streams may be made via other and/or additional methods without departing from embodiments disclosed herein.

In one or more embodiments disclosed herein, if it is determined that the stream is associated with duplicate streams, then the method proceeds to Step 240. In one or more embodiments disclosed herein, if it is determined that the stream is not associated with duplicate streams, then the method proceeds to Step 241.

In Step 240, the stream status is updated to terminated. In one or more embodiments, the stream manager may update the stream status associated with the stream in the stream database entry to indicate that the stream is terminated. The stream manager may overwrite the previous stream status with information that indicates that the stream is terminated. For example, the stream manager may set a terminated bit, write the string "terminated", or include some other information in the stream status that may indicate that the stream is terminated without departing from embodiments disclosed herein. The stream status may be updated to terminated via other and/or additional methods without departing from embodiments disclosed herein.

In one or more embodiments disclosed herein, the method ends following Step 240.

In Step 241, the entries associated with the stream are deleted from the mini-batch database. In one or more embodiments, the stream manager may identify mini-batch entries in the mini-batch database associated with the stream using the stream identifier. The stream manager may identify all mini-batch entries that include the stream identifier as mini-batch entries associated with the stream. The stream manager may then delete all mini-batch entries associated with the stream from the mini-batch database. The entries associated with the stream may be deleted from the mini-batch database via other and/or additional methods without departing from embodiments disclosed herein.

In Step 242, the data associated with the stream is deleted from the cache. In one or more embodiments, the stream manager may identify training data example entries in the training data example database associated with the stream using the stream identifier. The stream manager may identify all training data example entries that include the stream identifier as training data entries associated with the stream. The stream manager may then identify all training data example identifiers included in the associated training data example entries associated with the stream. The stream manager may then instruct the ingestor or the cache manager to delete all training data examples in the cache that are associated with the identified training data example identifiers. The ingestor or the cache manager may use an index to delete the data in the cache corresponding to the training data examples associated with the identified training data example identifiers. The data associated with the stream may be deleted from the cache via other and/or additional methods without departing from embodiments disclosed herein.

In Step 243, the entries associated with the stream are deleted from the training data example database. As discussed above in Step 242, the stream manager may identify all training data example entries that include the stream identifier as training data entries associated with the stream. In one or more embodiments, the stream manager may then delete all identified training data example entries associated with the stream from the training data example database. The entries associated with the stream may be deleted from the training data example database via other and/or additional methods without departing from embodiments disclosed herein.

In one or more embodiments disclosed herein, the method proceeds to Step 240 following Step 243.

FIG. 2F shows a flowchart of a method for saving a stream in accordance with one or more embodiments disclosed herein. The method shown in FIG. 2F may be performed by, for example, a TDSM (e.g., 110, FIG. 1A) and/or components therein. Other components of the system in FIGS. 1A-1B may perform all, or a portion, of the method of FIG. 2F without departing from the scope of the embodiments described herein. While FIG. 2F is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 244, a stream associated with the save request is identified. In one or more embodiments, the save request may include a stream identifier associated with the stream that is the target of the save request. In one or more embodiments, the stream manager may use the stream identifier included in the save request to identify the stream associated with the save request. The stream identifier included in the save request may be matched with a stream identifier included in a stream entry of the stream database to identify the stream associated with the save request. The stream associated with the save request may be identified via other and/or additional methods without departing from embodiments disclosed herein.

In Step 245, the stream status is updated to indicate a save is in progress. In one or more embodiments, the stream manager may update the stream status associated with the stream in the stream database entry to indicate that the stream is currently being saved. The stream manager may overwrite the previous stream status with information that indicates that the stream is currently being saved. For example, the stream manager may set a saving bit, write the string "saving", or include some other information in the stream status that may indicate that the stream is saving without departing from embodiments disclosed herein. The stream status may be updated to indicate a save is in progress via other and/or additional methods without departing from embodiments disclosed herein.

In Step 246, the stream database entries, training data example database entries, and mini-batch database entries associated with the stream are saved in a log file. In one or more embodiments, the stream manager may send a request to save the stream to the logger. The request may include the stream identifier. In response to obtaining the request, the logger may generate a log file. In one or more embodiments, the logger may copy all training data example database entries, all mini-batch database entries, and the stream database entry that includes the stream identifier (i.e., that are associated with the stream to be saved) and include the entries in the log file. The stream database entries, training data example database entries, and the mini-batch entries associated with the stream may be saved in the log file via other and/or additional methods without departing from embodiments disclosed herein.

In Step 247, the log file is stored in storage. In one or more embodiments, the logger may store the log file in the storage of the TDSM. In other embodiments, the logger may store the log file in other storage of other entities (e.g., archive storage, secondary storage, etc.). The log file may be used for future restorations of the stream. The log file may be stored in storage via other and/or additional methods without departing from embodiments disclosed herein.

In Step 248, the stream status is update that the stream is ready. In one or more embodiments, the stream manager may update the stream status associated with the stream in the stream database entry to indicate that the stream is ready. The stream manager may overwrite the previous stream status with information that indicates that the stream is ready. For example, the stream manager may set a ready bit, write the string "ready", or include some other information in the stream status that may indicate that the stream is ready without departing from embodiments disclosed herein. The stream status may be updated to indicate a save is ready via other and/or additional methods without departing from embodiments disclosed herein.

In one or more embodiments disclosed herein, the method ends following Step 248.

FIG. 2G shows a flowchart of a method for creating a stream with unstructured data in accordance with one or more embodiments disclosed herein. The method shown in FIG. 2G may be performed by, for example, a TDSM (e.g., 110, FIG. 1A) and/or components therein. Other components of the system in FIGS. 1A-1B may perform all, or a portion, of the method of FIG. 2G without departing from the scope of the embodiments described herein. While FIG. 2G is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 249, a new stream entry is created in the stream database. In one or more embodiments, the stream manager may generate a stream identifier associated with the stream. The stream manager may generate a new stream entry in the stream database. The stream entry may include the generated stream identifier associated with the stream. The stream manager may set the stream status in the stream entry to indicate that the stream is initializing (i.e., preparing for streaming). The stream manager may include information that was included in a stream API request that initiated Step 249 in the stream entry such as, for example, a stream specification. After generating the new stream entry in the stream database, stream manager may provide the stream identifier to the client to use for future stream API calls associated with the stream. The new stream entry may be created in the stream database via other and/or additional methods without departing from embodiments disclosed herein.

In Step 250, a determination is made as to whether the stream is associated with unstructured data. In one or more embodiments, a stream API request that initiated the Step 249 may include or otherwise be associated with an unstructured data indicator. For example, the request may include a tag, header information, and/or other indicators (e.g., a manifest associated with unstructured data, a stream specification, etc.) that indicate whether the stream associated with the stream API request is associated with unstructured data. In one or more embodiments, the stream manager checks the stream API request to identify a tag, header information, and/or other indicators that specify the creation request sub-type. In one or more embodiments, if the stream manager identifies a tag, header information, and/or another indicator associated with unstructured data, then the stream manager may determine that the stream is associated with unstructured data. In one or more embodiments, if the stream manager does not identify a tag, header information, and/or another indicator associated with unstructured data, then the stream manager may determine that the stream is not associated with unstructured data. The determination as to whether the creation request is a new stream request may be made via other and/or additional methods without departing from embodiments disclosed herein.

In one or more embodiments disclosed herein, if it is determined that the stream is associated with unstructured data, then the method proceeds to Step 251. In one or more embodiments disclosed herein, if it is determined that the stream is not associated with unstructured data, then the method proceeds to Step 254.

In Step 251, a manifest associated with the unstructured data is obtained based on the stream request. In one or more embodiments, the manifest may be included in the stream API request. Accordingly, the stream manager may obtain the manifest directly from the stream API request. In another embodiment, the stream specification included in the stream API request may specify the storage location (e.g., network addresses, Uniform Resource Locators (URLs), etc.) of the manifest. The stream manager may then obtain the manifest using the storage location in the stream specification. The manifest associated with the unstructured data may be obtained via other and/or additional methods without departing from embodiments disclosed herein.

In one or more embodiments, the manifest may refer to one or more data structures (e.g., JSON files, YAML files, TOML files, etc.) that include information associated with unstructured data. The information may include a list of unstructured data object identifiers associated with unstructured data objects, the source information associated with the unstructured data objects, and metadata associated with the unstructured data objects. The unstructured data object identifiers may be a unique combination of bits and/or alphanumeric characters that are associated with and specify a particular unstructured data object. The source information may include any appropriate information associated with sources of the unstructured data (e.g., file name, table name, client identifier, network address, storage address, etc.) without departing from embodiments disclosed herein. The metadata may include, for example, additional information that may be used to generate training data examples from the unstructured data objects. The metadata may include context metadata and/or content metadata. The context metadata may include, for example, information regarding the context of the unstructured data object. The content metadata may include information regarding the semantic meaning of the unstructured data object. The context metadata and/or the content metadata may vary from one object type to the next. The unstructured data objects may include any unstructured data object type without departing from embodiments disclosed herein (e.g., PDF files, image files, video files, sound files, DICOM files, etc.). The manifest may include other and/or additional information without departing from embodiments disclosed herein. The manifest may be generated by a user of the system.

In Step 252, unstructured data is loaded using the manifest. In one or more embodiments, the stream manager may send a request to the ingestor to obtain the unstructured data associated with the stream. The request may include the stream identifier. In response to obtaining the request, the ingestor may obtain the source information from the manifest included in the stream database entry associated with the stream using the stream identifier. The ingestor may then use the source information to read or otherwise obtain the unstructured data from the source. In one or more embodiments, the ingestor may obtain portions of unstructured data from multiple sources using the manifest without departing from embodiments disclosed herein. The unstructured data may be loaded using the manifest via other and/or additional methods without departing from embodiments disclosed herein.

In Step 253, the metadata is merged with the unstructured data to generate training data examples. In one or more embodiments, the ingestor may then merge each of the unstructured data objects with one or more metadata portions (e.g., features) based on the manifest to generate training data examples. Each unstructured data object may be used to generate one or more training data examples. For example, an unstructured data object may be associated with two different features (e.g., an image file that includes a cat and a dog). The unstructured data object may be merged with a first feature to generate a first training data example, and then a copy of the unstructured data object may be merged with the second feature to generate a second training data example. The ingestor may then assign training data example identifiers to the generated training data examples and generate training data example entries associated with the identified training data examples in the training data example database. The ingestor may include the training data example identifiers in the corresponding training data example entries in the training data example database. The ingestor may then store each of the training data examples in the cache. The metadata may be merged with the unstructured data to generate training data examples via other and/or additional methods without departing from embodiments disclosed herein.

In one or more embodiments disclosed herein, the method proceeds to Step 255 following Step 253.

In Step 254, the training data associated with the creation request is loaded. In one or more embodiments, the new stream request may include a stream specification. As discussed above, the stream specification may include source information that may be used to obtain the training data associated with the creation request. The stream manager may send a request to the ingestor to obtain the training data associated with the stream. The request may include the stream identifier. In response to obtaining the request, the ingestor may obtain the source information from the stream database entry associated with the stream using the stream identifier. The ingestor may then use the source information to read or otherwise obtain the training data from the source. As the ingestor reads the training data, the ingestor may parse the training data to identify individual training data examples. The ingestor may then assign training data example identifiers to the identified training data examples and generate training data example entries associated with the identified training data examples in the training data example database. The ingestor may then store each of the training data examples in the cache. The training data associated with the creation request may be loaded via other and/or additional methods without departing from embodiments disclosed herein.

In Step 255, augmented training data is generated using the training data. In one or more embodiments, the stream manager may request the augmentation engine to perform augmentation operations on the training data examples in the cache. The request may include the stream identifier associated with the stream. In response to obtaining the request, the augmentation engine may obtain the augmentation parameters from the stream specification stored in the stream database entry associated with the stream using the stream identifier. The augmentation engine may iterate over the training data example identifiers associated with the stream and selecting training data example identifiers for augmentation based on the augmentation frequency specified by the augmentation parameters. The augmentation engine may then generate new training data example entries in the training data example database for the to-be generated augmented training data examples. The augmentation engine may set the augmented training data example status to processing. The augmentation engine may query the training data example database for augmented training data examples with the processing status. The augmentation engine may then perform the one or more augmentation operations on the parent training data examples in the cache corresponding to and based on the augmentation training data example entries to generate the augmented training data examples. The augmentation engine may then store the generated augmented training data examples in the cache. The augmented training data may be generated using the training data via other and/or additional methods without departing from embodiments disclosed herein.

In Step 256, a mini-batch sequence is generated using the augmented training data. In one or more embodiments, the stream manager may request the RB to generate mini-batches. The request may include the stream identifier associated with the stream. In response to obtaining the request, the RB may obtain the mini-batch parameters from the stream specification stored in the stream database entry associated with the stream using the stream identifier. The RB may then obtain all training data example identifiers (including augmented training data example identifiers) associated with the stream identifier from the training data example database. The RB may then randomly assign the training data example identifiers to mini-batches and may randomly assign each mini-batch a sequence number based on the mini-batch parameters. The RB may then generate a mini-batch entry associated with each generated mini-batch in the mini-batch database. A mini-batch may refer to a group of training data examples. A mini-batch sequence may refer to an ordered list of mini-batches. The mini-batch sequence may span the entire training process for a targeted machine learning model training as specified by the mini-batch parameters. The mini-batch sequence may be generated using the augmented training data via other and/or additional methods without departing from embodiments disclosed herein.

In Step 257, the mini-batch sequence queue and the stream endpoint are generated. In one or more embodiments, the stream manager may send a request to the stream provider to generate the mini-batch sequence queue and the stream endpoint. The request may include the stream identifier. In one or more embodiments, the stream provider may read each of the mini-batch database entries associated with the stream identifier to obtain the training data example identifiers associated with each mini-batch. The stream provider may then retrieve the training data examples associated with each mini-batch from the cache using the training data example identifiers. The stream provider may combine the training data examples of a mini-batch into a single message and place the message in the mini-batch sequence queue. The stream provider may also inject end-of-epoch and/or end-of-stream markers into the messages when necessary based on the mini-batch entries associated with the mini-batches. The stream provider may add mini-batches to the mini-batch sequence queue based on the sequence number associated with the mini-batch. In other words, mini-batches may be generated and added to the mini-batch sequence queue in sequence order. The mini-batch sequence queue may be, for example, a first-in-first-out (FIFO) queue that includes messages comprising the training data examples of mini-batches to be streamed to the training environment. The stream provider may then instantiate, generate, and/or otherwise provide a stream server API endpoint that one or more clients of the training environment may use to retrieve the mini-batches in the mini-batch sequence queue. The mini-batch sequence queue and the stream endpoint may be generated via other and/or additional methods without departing from embodiments disclosed herein.

In Step 258, the mini-batch sequences are streamed using the mini-batch sequence queue and the stream endpoint. As discussed above, the stream provider may provide a stream server API endpoint to one or more clients of the training environment that may be used to retrieve the mini-batches in the mini-batch sequence queue. The stream provider may provide other information (e.g., the stream identifier and/or access credentials such as encryption keys, public keys, passwords, etc.) that the clients of the training environment may use to retrieve the mini-batches. In one or more embodiments, the clients of the training environment may submit requests (e.g., stream server API requests) for the next mini-batch in the mini-batch sequence queue. In response to obtaining the request, the stream provider, may, through the stream server API endpoint, provide the next mini-batch in the mini-batch sequence queue to the client of the training environment. In one or more embodiments, once a mini-batch is streamed to the training environment, the mini-batch may be removed from the mini-batch sequence queue.

In one or more embodiments, the mini-batch sequence queue may only include a portion of the mini-batches included in the mini-batch sequence. In such scenarios, the stream provider may repeat the methods of Step 257 to generate and add more mini-batches to the mini-batch sequence queue until all mini-batches in the mini-batch sequence are streamed. In one or more embodiments, the stream provider may generate and load mini-batches into the mini-batch sequence queue at the same rate that the mini-batches are streamed to the training environment. For example, when a mini-batch is streamed and removed from the mini-batch sequence queue, the stream provider may generate and add the next mini-batch in the mini-batch sequence to the mini-batch sequence queue. As the client of the training environment obtain the mini-batches from the TDSM, the client may apply a machine learning training algorithm to the mini-batches to train a machine learning prediction model.

In one or more embodiments, the stream may be duplicated any number of times and sent to other clients in the training environment. In such scenarios, each duplicate stream may include its own mini-batch sequence queue, that while streaming the same mini-batch sequence as the parent stream and other duplicates of the parent stream, may be streamed independently of each other. For example, the parent stream may be streamed in a lesser amount of time while a duplicate stream may be streamed in a longer amount of time. As a result, streams may not be delayed based on throughput issues associated with other streams.

The mini-batch sequences may be streamed using the mini-batch sequence queue and the stream endpoint via other and/or additional methods without departing from embodiments disclosed herein.

In one or more embodiments disclosed herein, the method ends following Step 258.

FIG. 2H shows a flowchart of a method for creating a high performance stream in accordance with one or more embodiments disclosed herein. The method shown in FIG. 2H may be performed by, for example, a TDSM (e.g., 110, FIG. 1A) and/or components therein. Other components of the system in FIGS. 1A-1B may perform all, or a portion, of the method of FIG. 2H without departing from the scope of the embodiments described herein. While FIG. 2H is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 259, a new stream entry is created in the stream database. In one or more embodiments, the stream manager may generate a stream identifier associated with the stream. The stream manager may generate a new stream entry in the stream database. The stream entry may include the generated stream identifier associated with the stream. The stream manager may set the stream status in the stream entry to indicate that the stream is initializing (i.e., preparing for streaming). The stream manager may include information that was included in a stream API request that initiated Step 249 in the stream entry such as, for example, a stream specification. After generating the new stream entry in the stream database, stream manager may provide the stream identifier to the client to use for future stream API calls associated with the stream. The new stream entry may be created in the stream database via other and/or additional methods without departing from embodiments disclosed herein.

In Step 260, the training data associated with the creation request is loaded. In one or more embodiments, the new stream request may include a stream specification. As discussed above, the stream specification may include source information that may be used to obtain the training data associated with the creation request. The stream manager may send a request to the ingestor to obtain the training data associated with the stream. The request may include the stream identifier. In response to obtaining the request, the ingestor may obtain the source information from the stream database entry associated with the stream using the stream identifier. The ingestor may then use the source information to read or otherwise obtain the training data from the source. As the ingestor reads the training data, the ingestor may parse the training data to identify individual training data examples. The ingestor may then assign training data example identifiers to the identified training data examples and generate training data example entries associated with the identified training data examples in the training data example database. The ingestor may then store each of the training data examples in the cache. The training data associated with the creation request may be loaded via other and/or additional methods without departing from embodiments disclosed herein.

In Step 261, augmented training data is generated using the training data. In one or more embodiments, the stream manager may request the augmentation engine to perform augmentation operations on the training data examples in the cache. The request may include the stream identifier associated with the stream. In response to obtaining the request, the augmentation engine may obtain the augmentation parameters from the stream specification stored in the stream database entry associated with the stream using the stream identifier. The augmentation engine may iterate over the training data example identifiers associated with the stream and selecting training data example identifiers for augmentation based on the augmentation frequency specified by the augmentation parameters. The augmentation engine may then generate new training data example entries in the training data example database for the to-be generated augmented training data examples. The augmentation engine may set the augmented training data example status to processing. The augmentation engine may query the training data example database for augmented training data examples with the processing status. The augmentation engine may then perform the one or more augmentation operations on the parent training data examples in the cache corresponding to and based on the augmentation training data example entries to generate the augmented training data examples. The augmentation engine may then store the generated augmented training data examples in the cache. The augmented training data may be generated using the training data via other and/or additional methods without departing from embodiments disclosed herein.

In Step 262, a mini-batch sequence is generated using the augmented training data. In one or more embodiments, the stream manager may request the RB to generate mini-batches. The request may include the stream identifier associated with the stream. In response to obtaining the request, the RB may obtain the mini-batch parameters from the stream specification stored in the stream database entry associated with the stream using the stream identifier. The RB may then obtain all training data example identifiers (including augmented training data example identifiers) associated with the stream identifier from the training data example database. The RB may then randomly assign the training data example identifiers to mini-batches and may randomly assign each mini-batch a sequence number based on the mini-batch parameters. The RB may then generate a mini-batch entry associated with each generated mini-batch in the mini-batch database. A mini-batch may refer to a group of training data examples. A mini-batch sequence may refer to an ordered list of mini-batches. The mini-batch sequence may span the entire training process for a targeted machine learning model training as specified by the mini-batch parameters. The mini-batch sequence may be generated using the augmented training data via other and/or additional methods without departing from embodiments disclosed herein.

In Step 263, the mini-batch sequence queue and the stream endpoint are generated. In one or more embodiments, the stream manager may send a request to the stream provider to generate the mini-batch sequence queue and the stream endpoint. The request may include the stream identifier. In one or more embodiments, the stream provider may read each of the mini-batch database entries associated with the stream identifier to obtain the training data example identifiers associated with each mini-batch. In one or more embodiments, the stream provider may generate mini-batch sequence access information based on the training data examples associated with each mini-batch. The mini-batch sequence access information may include one or more pointers to the training data examples in the cache for each of the mini-batches. The mini-batch sequence access information may include other and/or additional information associated with the storage location of training data examples in the cache without departing from embodiments disclosed herein. The mini-batch sequence access information for the mini-batches may be generated and ordered based on the mini-batch sequence numbers associated with the corresponding mini-batches and placed in the mini-batch sequence queue. The stream provider may also inject end-of-epoch and/or end-of-stream markers into the mini-batch sequence access information when necessary based on the mini-batch entries associated with the mini-batches.

The stream provider may add mini-batch sequence access information to the mini-batch sequence queue based on the sequence number associated with the mini-batch. In other words, mini-batch sequence access information may be generated and added to the mini-batch sequence queue in sequence order. The mini-batch sequence queue may be, for example, a first-in-first-out (FIFO) queue that includes mini-batch sequence access information associated with the training data examples of mini-batches to be streamed to the training environment. The stream provider may then instantiate, generate, and/or otherwise provide a stream server API endpoint that one or more clients of the training environment may use to retrieve the mini-batch sequence access information in the mini-batch sequence queue. The mini-batch sequence queue and the stream endpoint may be generated via other and/or additional methods without departing from embodiments disclosed herein.

In Step 264, a data transfer API associated with the cache is set up. In one or more embodiments, the stream provider may instantiate, generate, and/or otherwise provide a data transfer API that one or more clients of the training environment may use to retrieve the mini-batches in the mini-batch sequence queue from the cache based on mini-batch sequence access information. The data transfer API associated with the cache may be set up via other and/or additional methods without departing from embodiments disclosed herein.

In Step 265, mini-batches are streamed to a client in the training environment using the stream endpoint, the mini-batch sequence queue, and the data transfer API, and mini-batch sequence access information. In one or more embodiments, the stream provider may generate mini-batch sequence access information based on the mini-batch sequence queue. The mini-batch sequence access information may include one or more pointers to the messages in the cache that include the training data examples of mini-batches in the mini-batch sequence queue. The mini-batch sequence access information for the mini-batches may be generated and ordered based on the mini-batch sequence numbers associated with the corresponding mini-batches.

As discussed above, the stream provider may provide a stream server API endpoint to one or more clients of the training environment that may be used to retrieve the mini-batches in the mini-batch sequence queue. The stream provider may provide other information (e.g., the stream identifier and/or access credentials such as encryption keys, public keys, passwords, etc.) that the clients of the training environment may use to retrieve the mini-batches and/or the mini-batch sequence access information. In one or more embodiments, the clients of the training environment may submit requests (e.g., stream server API requests) for mini-batch sequence access information associated with the next mini-batch in the mini-batch sequence queue. In response to obtaining the request, the stream provider, may, through the stream server API endpoint, provide the next mini-batch sequence access information associated with the next mini-batch in the mini-batch sequence queue to the client of the training environment.

In one or more embodiments, the mini-batch sequence access information may be streamed using a first network fabric (not shown in the systems of FIGS. 1A-1B). A network fabric may refer to the devices (e.g., hubs, switches, adapter endpoints, network interface controllers (NICs), the connecting cables, etc.) that support a network communication protocol between devices. The first network fabric may include any appropriate standard network fabric (e.g., storage area network (SAN) fabric, a wide area network (WAN) fabric, etc.) associated with any appropriate standard network communication protocol (e.g., Fibre Channel Protocol (FCP), Internet Small Computer System Interface (iSCSI), Transmission Control Protocol (TCP), etc.) without departing from embodiments disclosed herein.

In one or more embodiments, after the client obtains the mini-batch sequence access information associated with a mini-batch in the mini-batch sequence queue, the client may use the data transfer API to obtain the mini-batch training data examples directly from the cache. The data transfer API may enable the client to perform remote direct memory access (RDMA) operations to directly access data (e.g., training data examples of mini-batches) stored remotely in the cache of the TDSM. The RDMA operations may also be performed in a second high performance network fabric associated with a second high performance network communication protocol (not shown in the systems of FIGS. 1A-1B). The second high performance network fabric may include more computing resources that may be more powerful than the fabric devices in the first network fabric. The second high performance network fabric may include any appropriate high performance network fabric supporting any appropriate high performance network communication protocol without departing from embodiments disclosed herein. The second high performance network communication protocol may include a high performance network communication protocol such as, for example, InfiniBand or non-volatile memory express over fabrics (NVMe-oF).

Accordingly, the cache data may be obtained or otherwise transferred via RDMA operations performed over the second network fabric using the second network communication protocol in a manner that is faster than the if the cache data was streamed through the first network fabric using the first network communication protocol.

In one or more embodiments, once a mini-batch is obtained from the cache by the client of the training environment, the mini-batch may be removed from the mini-batch sequence queue. In one or more embodiments, the mini-batch sequence queue may only include a portion of the mini-batches included in the mini-batch sequence. In such scenarios, the stream provider may generate and add more mini-batches and mini-batch sequence access information to the mini-batch sequence queue until all mini-batches in the mini-batch sequence are obtained by the client. In one or more embodiments, the stream provider may generate and load mini-batches and mini-batch sequence access information into the mini-batch sequence queue at the same rate that the mini-batches are obtained by the client of the training environment.

The mini-batches may be streamed to a client in the training environment using the stream endpoint, the mini-batch sequence queue, the data transfer API, and the mini-batch sequence access information via other and/or additional methods without departing from embodiments disclosed herein.

In one or more embodiments disclosed herein, the method ends following Step 265.

FIG. 2I shows a flowchart of a method for evicting a cache in accordance with one or more embodiments disclosed herein. The method shown in FIG. 2I may be performed by, for example, a TDSM (e.g., 110, FIG. 1A) and/or components therein. Other components of the system in FIGS. 1A-1B may perform all, or a portion, of the method of FIG. 2I without departing from the scope of the embodiments described herein. While FIG. 2I is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 266, cache utilization is monitored. In one or more embodiments, the cache manager of the TDSM may monitor the utilization of the cache. The cache manager may track the amount of data currently (e.g., in bytes, kilobytes, megabytes, gigabytes, etc.) stored in the cache and/or the amount of storage capacity (e.g., in bytes, kilobytes, megabytes, gigabytes, etc.) currently available in the cache. The cache manager may also track other information associated with the cache (e.g., read latency, write latency, number of training data examples included, etc.) without departing from embodiments disclosed herein. The cache utilization may be monitored via other and/or additional methods without departing from embodiments disclosed herein.

In Step 267, a determination is made as to whether an eviction is needed. In one or more embodiments, the cache manager may use the information tracked above in Step 266 to determine whether an eviction is needed. As discussed above, the cache manager may track the amount of data currently (e.g., in bytes, kilobytes, megabytes, gigabytes, etc.) stored in the cache and/or the amount of storage capacity (e.g., in bytes, kilobytes, megabytes, gigabytes, etc.) currently available in the cache. In one or more embodiments, the cache manager may also include a cache threshold. In one or more embodiments, a cache threshold may refer to a maximum allowable quantity of data that may be stored in the cache or the minimum amount of required available capacity the cache must meet. In one or more embodiments, the cache manager may compare the current quantity of data stored on the cache and/or the current amount of storage capacity available on the cache with the cache threshold to determine whether an eviction is needed. In one or more embodiments disclosed herein, if the current quantity of data stored on the cache or the current amount of available storage capacity exceed the cache threshold, then the cache manager may determine that an eviction is needed. In one or more embodiments disclosed herein, if the current quantity of data stored on the cache or the current amount of available storage capacity does not exceed the cache threshold, then the cache manager may determine that an eviction is not needed. The determination as to whether an eviction is needed may be made via other and/or additional methods without departing from embodiments disclosed herein.

In one or more embodiments disclosed herein, if it is determined that an eviction is needed, then the method proceeds to Step 269. In one or more embodiments disclosed herein, if it is determined that an eviction is not needed, then the method proceeds to Step 266.

In Step 268, a training data example is selected for eviction. In one or more embodiments, the cache manager may select for eviction a training data example stored in the cache. In one or more embodiments, the cache manager may randomly select a training data example that has not already been selected for this eviction operation. In another embodiment, the cache manager may select a training data example based on some selection criteria (e.g., longest stored training data example selected first, training data example size, etc.). The training data example may be selected for eviction via other and/or additional methods without departing from embodiments disclosed herein.

In Step 269, a determination is made as to whether the stream reference count associated with the training data example is zero. In one or more embodiments, the cache manager may check the training data example entry of the training data example database associated with the selected training data example for the stream reference count. In one or more embodiments, the stream reference count may refer to a positive integer that represents the number of scheduled or queued mini-batches that require the training data example. In one or more embodiments disclosed herein, if the stream reference count is greater than zero, then the cache manager determines that the stream reference count is not zero. In one or more embodiments disclosed herein, if the stream reference count equals zero, then the cache manager determines that the stream reference count is zero. The determination as to whether the stream reference count associated with the training data example is zero may be made via other and/or additional methods without departing from embodiments disclosed herein.

In one or more embodiments disclosed herein, if it is determined that the stream reference count is zero, then the method proceeds to Step 270. In one or more embodiments disclosed herein, if it is determined that the stream reference count is not zero, then the method proceeds to Step 274.

In Step 270, a determination is made as to whether the training data example is needed for a future scheduled mini-batch. In one or more embodiments, the cache manager may also monitor the stream positions in the mini-batch sequences based on the mini-batch sequence queue and the mini-batch database entries that include the training data example identifier associated with the selected training data example. The cache manager may use this information to check whether the training data example is required for future or upcoming mini-batches, the number of times the training data example is scheduled to be used in future or upcoming mini-batches, and the distance(s) in the mini-batch sequence(s) associated with the scheduled mini-batches that include the training data example. In one or more embodiments disclosed herein, if the associated mini-batch sequence queues and mini-batch database entries indicate that the training data example is scheduled to be included in future generated mini-batches, then the cache manager may determine that the training data example is needed for a future scheduled mini-batch. In one or more embodiments disclosed herein, if the associated mini-batch sequence queues and mini-batch database entries indicate that the training data example is not scheduled to be included in future generated mini-batches, then the cache manager may determine that the training data example is not needed for a future scheduled mini-batch. The determination as to whether the training data example is not needed for a future scheduled mini-batch may be made via other and/or additional methods without departing from embodiments disclosed herein.

In one or more embodiments disclosed herein, if it is determined that the training data example is not needed for a future scheduled mini-batch, then the method proceeds to Step 271. In one or more embodiments disclosed herein, if it is determined that the training data example is needed for a future scheduled mini-batch, then the method proceeds to Step 274.

In Step 271, a determination is made as to whether there are a few remaining mini-batches associated with the training data example. In one or more embodiments, the cache manager may use the mini-batch database entries and the mini-batch sequence queue positions associated with the selected training data example to determine how many mini-batches are left to be streamed in the one or more streams associated with the selected training data example. The fewer the amount of mini-batches in the streams associated with the training data example, the less likely a duplicate stream may be created and therefore, the less likely the selected training data example will be required in the near future. The cache manager may include a user configurable remaining mini-batch threshold that may specify a particular quantity of remaining mini-batches to be streamed. In one or more embodiments, the cache manager may compare the quantity of remaining mini-batches associated with the training data example and the remaining mini-batch threshold. In one or more embodiments, if the quantity of remaining mini-batches associated with the training data example is below the remaining mini-batch threshold, then the cache manager may determine that there are a few remaining mini-batches. In one or more embodiments, if the quantity of remaining mini-batches associated with the training data example is greater than or equal to the remaining mini-batch threshold, then the cache manager may determine that there are not a few remaining mini-batches. The determination as to whether there are a few remaining mini-batches associated with the training data example may be made via other and/or additional methods without departing from embodiments disclosed herein.

In one or more embodiments disclosed herein, if it is determined that there are a few remaining mini-batches associated with the training data example, then the method proceeds to Step 272. In one or more embodiments disclosed herein, if it is determined that there are not a few remaining mini-batches associated with the training data example, then the method proceeds to Step 274.

In Step 272, a determination is made as to whether the training data example is easy to regenerate. In one or more embodiments, the cache manager may check the training data example database entry associated with the training data example to identify whether the training data example is an augmented training data example or was used to generate an augmented training data example. In one or more embodiments, if the training data example database entry indicates that the training data example is an augmented training data example or was used to generate an augmented training data example, then the cache manager may determine that the training data example is not easy to regenerate. In one or more embodiments, if the training data example database entry indicates that the training data example is not an augmented training data example and was not used to generate an augmented training data example, then the cache manager may determine that the training data example is easy to regenerate. The determination as to whether the training data example is easy to regenerate may be made via other and/or additional methods without departing from embodiments disclosed herein.

In Step 273, the training data example is evicted and the training data example database entry state associated with the training data example is updated to evicted. In one or more embodiments, the cache manager may delete the data associated with the training data from the cache. In one or more embodiments, the cache manager may update the training data example status associated with the training data example status in the corresponding training data example database entry to indicate that the training data example is evicted from the cache. The stream manager may overwrite the previous training data example status with information that indicates that the training data example is evicted. For example, the cache manager may set an evicted bit, write the string "evicted", or include some other information in the training data example status that may indicate that the training data example is evicted without departing from embodiments disclosed herein. The training data example may be evicted and the training data example database entry associated with the training data example state may be updated to evicted via other and/or additional methods without departing from embodiments disclosed herein.

In one or more embodiments disclosed herein, the method ends following Step 273.

In Step 274, a determination is made as to whether additional evictions are needed. In one or more embodiments, the cache manager may use the information tracked above in Step 266 to determine whether additional evictions are needed. In one or more embodiments, the cache manager may use the methods discussed above in Step 267 to determine whether additional evictions are needed. The determination as to whether additional evictions are needed may be made via other and/or additional methods without departing from embodiments disclosed herein.

In one or more embodiments disclosed herein, if it is determined that additional evictions are needed, then the method proceeds to Step 268. In one or more embodiments disclosed herein, if it is determined that no additional evictions are needed, then the method ends following Step 274. Alternatively, in other embodiments, if it is determined that if it is determined that no additional evictions are needed, then the method may proceed to Step 266 to continually monitor the cache utilization for another cache eviction operation.

FIG. 2J shows a flowchart of a method for identifying evicted training data examples for reloading in accordance with one or more embodiments disclosed herein. The method shown in FIG. 2J may be performed by, for example, a TDSM (e.g., 110, FIG. 1A) and/or components therein. Other components of the system in FIGS. 1A-1B may perform all, or a portion, of the method of FIG. 2J without departing from the scope of the embodiments described herein. While FIG. 2J is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 274, a mini-batch entry for a next mini-batch is obtained. In one or more embodiments, during stream creation (e.g., see FIGS. 2B-2C), the stream provider may obtain a mini-batch entry for a next mini-batch in order to generate the mini-batch and add the mini-batch to the mini-batch sequence queue to be streamed to the training environment. The stream provider may include the stream identifier associated with the stream currently being created. Additionally, the stream provider may track the current position in the mini-batch sequence. The stream provider may then use the stream identifier and the current mini-batch position to obtain the next mini-batch entry from the mini-batch database. The next mini-batch entry for the next mini-batch may be obtained via other and/or additional methods without departing from embodiments disclosed herein.

In Step 275, a training data example in the mini-batch is selected. As discussed above, the mini-batch database entry may include training data example identifiers associated with training data examples included in the mini-batch. In one or more embodiments, the stream provider may select a training data example identifier in the mini-batch database entry that was not previously selected. The training data example associated with the selected training data example database identifier may be the selected training data example. The training data example in the mini-batch may be selected via other and/or additional methods without departing from embodiments disclosed herein.

In Step 276, a training data example status associated with the training data example is obtained from the training data example database. In one or more embodiments, the stream provider may identify the training data example database entry associated with the selected training data example using the corresponding training data example identifier. The stream provider may then obtain the training data example status from the identified training data example database entry. The training data example status associated with the training data example may be obtained from the training data example database via other and/or additional methods without departing from embodiments disclosed herein.

In Step 277, a determination is made as to whether the training data example status indicates the training data example is evicted. As discussed above, the training data example status may specify the current state of the training data example. In one or more embodiments, the stream provider may check the training data example status to determine whether it specifies that the training data example is currently evicted. In one or more embodiments, if the training data example state indicates that the training data example is currently evicted, then the stream provider may determine that the training data example status is currently evicted. In one or more embodiments, if the training data example state indicates that the training data example is not currently evicted, then the stream provider may determine that the training data example status is not currently evicted. The determination is made as to whether the training data example status indicates the training data example is evicted may be made via other and/or additional methods without departing from embodiments disclosed herein.

In one or more embodiments disclosed herein, if it is determined that the training data example status indicates the training data example is evicted, then the method proceeds to Step 278. In one or more embodiments disclosed herein, if it is determined that the training data example status indicates the training data example is not evicted, then the method proceeds to Step 283.

In Step 278, the training data example status is updated to invalid. In one or more embodiments, the stream provider may update the training data example status associated with the training data example in the training data example database entry to indicate that the training data example is invalid. The stream provider may overwrite the previous training data example status with information that indicates that the training data example is invalid. For example, the stream provider may set an invalid bit, write the string "invalid", or include some other information in the training data example status that may indicate that the training data example is invalid without departing from embodiments disclosed herein. In one or more embodiments, the invalid status may be used to identify training data examples that need to be reloaded into the cache (e.g., refer to FIG. 2K). The training data example status may be updated to invalid via other and/or additional methods without departing from embodiments disclosed herein.

In Step 279, a determination is made as to whether the training data example is an augmented training data example. As discussed above, the training data example database entry may indicate whether the corresponding training data example is an augmented training data example. In one or more embodiments, the stream provider may check the training data example database entry associated with the training data example to determine whether the training data example is an augmented training data example. In one or more embodiments, if the training data example database entry indicates that the training data example is an augmented training data example, then the stream provider may determine that the training data example is an augmented training data example. In one or more embodiments, if the training data example database entry indicates that the training data example is not an augmented training data example, then the stream provider may determine that the training data example is not an augmented training data example. The determination as to whether the training data example is an augmented training data example may be made via other and/or additional methods without departing from embodiments disclosed herein.

In one or more embodiments disclosed herein, if it is determined that the training data example is an augmented training data example, then the method proceeds to Step 280. In one or more embodiments disclosed herein, if it is determined that the training data example is not an augmented training data example, then the method proceeds to Step 283.

In Step 280, a parent training data example status is obtained from the training data example database. In one or more embodiments, the training data example database entry associated with the selected training data example the parent training data example identifier used to generate the augmented training data example. The stream provider may then obtain the parent training data example status from the training data example database entry associated with the parent training data example identifier. The parent training data example status associated with the parent training data example may be obtained from the training data example database via other and/or additional methods without departing from embodiments disclosed herein.

In Step 281, a determination is made as to whether the parent training data example status is evicted. As discussed above, the parent training data example status may specify the current state of the parent training data example. In one or more embodiments, the stream provider may check the parent training data example status to determine whether it specifies that the parent training data example is currently evicted. In one or more embodiments, if the parent training data example state indicates that the parent training data example is currently evicted, then the stream provider may determine that the parent training data example status is currently evicted. In one or more embodiments, if the parent training data example state indicates that the parent training data example is not currently evicted, then the stream provider may determine that the parent training data example status is not currently evicted. The determination is made as to whether the parent training data example status indicates the parent training data example is evicted may be made via other and/or additional methods without departing from embodiments disclosed herein.

In one or more embodiments disclosed herein, if it is determined that the parent training data example status indicates the parent training data example is evicted, then the method proceeds to Step 282. In one or more embodiments disclosed herein, if it is determined that the parent training data example status indicates the parent training data example is not evicted, then the method proceeds to Step 283.

In Step 282, the parent training data example status is updated to invalid. In one or more embodiments, the stream provider may update the parent training data example status associated with the parent training data example in the parent training data example database entry to indicate that the parent training data example is invalid. The stream provider may overwrite the previous parent training data example status with information that indicates that the parent training data example is invalid. For example, the stream provider may set an invalid bit, write the string "invalid", or include some other information in the parent training data example status that may indicate that the parent training data example is invalid without departing from embodiments disclosed herein. In one or more embodiments, the invalid status may be used to identify training data examples that need to be reloaded into the cache (e.g., refer to FIG. 2K). The parent training data example status may be updated to invalid via other and/or additional methods without departing from embodiments disclosed herein.

In step 283, a determination is made as to whether there are additional training data examples in the mini-batch entry. In one or more embodiments, the stream provider may include a list of selected training data example identifiers that have been selected. In one or more embodiments, stream provider may compare the list of training data example identifiers that have been selected with the list of training data example identifiers in the mini-batch entry to determine whether there are additional training data examples in the mini-batch entry. In one or more embodiments, if the list of training data example identifiers that have been selected matches the list of training data example identifiers in the mini-batch entry, then the stream provider may determine that there are no other additional training data examples. In one or more embodiments, if the list of training data example identifiers that have been selected does not match the list of training data example identifiers in the mini-batch entry, then the stream provider may determine that there are additional training data examples. The determination as to whether there are additional training data examples in the mini-batch entry may be made via other and/or additional methods without departing from embodiments disclosed herein.

In one or more embodiments disclosed herein, if it is determined that there are additional training data examples in the mini-batch entry, then the method proceeds to Step 275. In one or more embodiments disclosed herein, if it is determined that there are no additional training data examples in the mini-batch entry, then the method ends following Step 283.

Figure 2K:
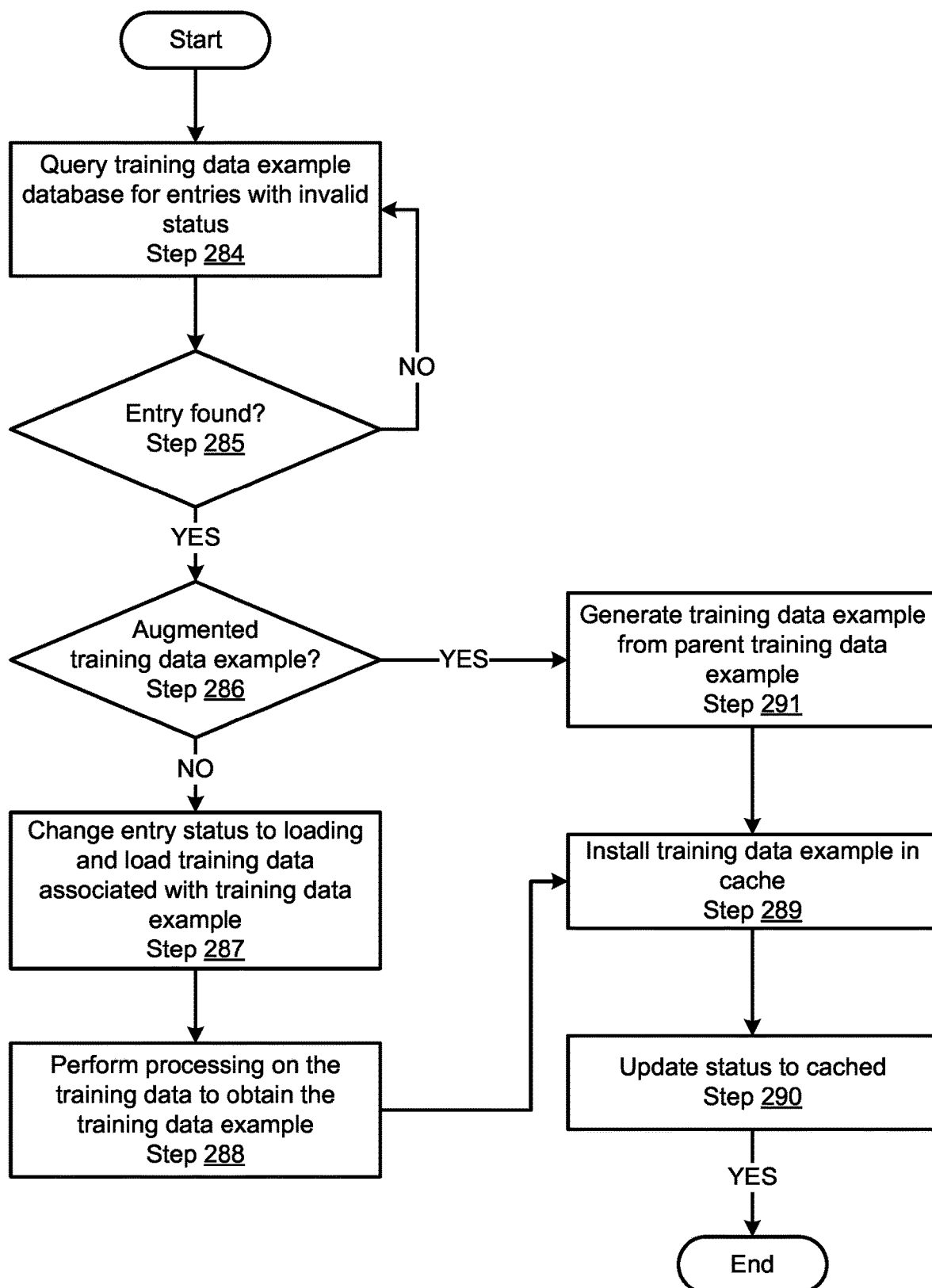
FIG. 2K shows a flowchart of a method for reloading evicted training data examples in a cache in accordance with one or more embodiments disclosed herein.

FIG. 2K shows a flowchart of a method for reloading evicted training data examples in a cache in accordance with one or more embodiments disclosed herein. The method shown in FIG. 2K may be performed by, for example, a TDSM (e.g., 110, FIG. 1A) and/or components therein. Other components of the system in FIGS. 1A-1B may perform all, or a portion, of the method of FIG. 2K without departing from the scope of the embodiments described herein. While FIG. 2K is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 284, the training data example database is queried for entries with invalid status. In one or more embodiments, the ingestor of the TDSM may periodically, or in near real time, query the training data example database for training data example database entries with an invalid status. The ingestor may iteratively check every training data example database entry in the training data example database for a training data example status that includes an invalid status. The training data example database may be queried for entries with an invalid status via other and/or additional methods without departing from embodiments disclosed herein.

In Step 285, a determination is made as to whether an entry is found. As discussed above, the ingestor may iteratively check every training data example database entry in the training data example database for a training data example status that includes an invalid status. In one or more embodiments, if a training data example database entry includes a training data example status that indicates the corresponding training data example is invalid, then the ingestor may determine that an entry is found. In one or more embodiments, if no training data example database entry includes a training data example status that indicates the corresponding training data example is invalid, then the ingestor may determine that an entry is not found. The determination as to whether an entry is found that includes an invalid status may be made via other and/or additional methods without departing from embodiments disclosed herein.

In one or more embodiments disclosed herein, if it is determined that a training data example entry is found that includes an invalid status, then the method proceeds to Step 286. In one or more embodiments disclosed herein, if it is determined that no training data example entry is found that includes an invalid status, then the method proceeds to Step 284.

In Step 286, a determination is made as to whether the training data example database entry is associated with an augmented training data example. As discussed above, the training data example database entry may indicate whether the corresponding training data example is an augmented training data example. In one or more embodiments, the ingestor may check the training data example database entry associated with the training data example to determine whether the training data example is an augmented training data example. In one or more embodiments, if the training data example database entry indicates that the training data example is an augmented training data example, then the ingestor may determine that the training data example is an augmented training data example. In one or more embodiments, if the training data example database entry indicates that the training data example is not an augmented training data example, then the ingestor may determine that the training data example is not an augmented training data example. The determination as to whether the training data example is an augmented training data example may be made via other and/or additional methods without departing from embodiments disclosed herein.

In one or more embodiments disclosed herein, if it is determined that the training data example is an augmented training data example, then the method proceeds to Step 291. In one or more embodiments disclosed herein, if it is determined that the training data example is not an augmented training data example, then the method proceeds to Step 287.

In Step 287, the training data entry status is changed to loading and the training data associated with the training data example is loaded. In one or more embodiments, the ingestor may update the training data example status associated with the training data example in the training data example database entry to indicate that the training data example is loading. The ingestor may overwrite the previous training data example status with information that indicates that the training data example is loading. For example, the ingestor may set a loading bit, write the string "loading", or include some other information in the training data example status that may indicate that the training data example is loading without departing from embodiments disclosed herein. The training data example status may be updated to invalid via other and/or additional methods without departing from embodiments disclosed herein.

As discussed above, the stream specification may include source information that may be used to obtain the training data associated with the training data example. The ingestor may obtain the source information from the stream database entry associated with the stream using the stream identifier included in the training data example database entry. The ingestor may then use the source information to read or otherwise obtain the training data from the source. The training data entry status may be changed to loading and the training data associated with the training data example may be loaded via other and/or additional methods without departing from embodiments disclosed herein.

In Step 288, processing is performed on the training data to obtain the training data example. As the ingestor reads the training data, the ingestor may parse the training data to identify and obtain the training data example associated with the training data example entry. Processing may be performed on the training data to obtain the training data example via other and/or additional methods without departing from embodiments disclosed herein.

In Step 289, the training data example is installed in the cache. In one or more embodiments, the ingestor may store the training data example in the cache of the TDSM. The ingestor may update the cache index based on the newly stored training data example. The training data example may be installed in the cache via other and/or additional methods without departing from embodiments disclosed herein.

In Step 290, the training data example status is updated to cached. In one or more embodiments, the ingestor may update the training data example status associated with the training data example in the training data example database entry to indicate that the training data example is cached. The ingestor may overwrite the previous training data example status with information that indicates that the training data example is cached. For example, the ingestor may set a cached bit, write the string "cached", or include some other information in the training data example status that may indicate that the training data example is cached without departing from embodiments disclosed herein. The training data example status may be updated to cached via other and/or additional methods without departing from embodiments disclosed herein.

In one or more embodiments disclosed herein, the method ends following Step 290.

In Step 291, the training data example is generated from the parent training data example. As discussed above, the training data example database entry may include the parent training data example identifier and one or more augmentation operations performed on the parent training data example to generate the augmented training data example. In one or more embodiments, the ingestor may provide the parent training data example identifier and the augmentation operations to the augmentation engine. In response to the obtaining the augmentation operations and the parent training data example identifier, the augmentation engine may perform the augmentation operations on the parent training data example associated with the parent training data example identifier to generate the augmented training data example. The training data example may be generated from the parent training data example via other and/or additional methods without departing from embodiments disclosed herein.

In one or more embodiments disclosed herein, the method proceeds to Step 289 following Step 291.

Figure 3:
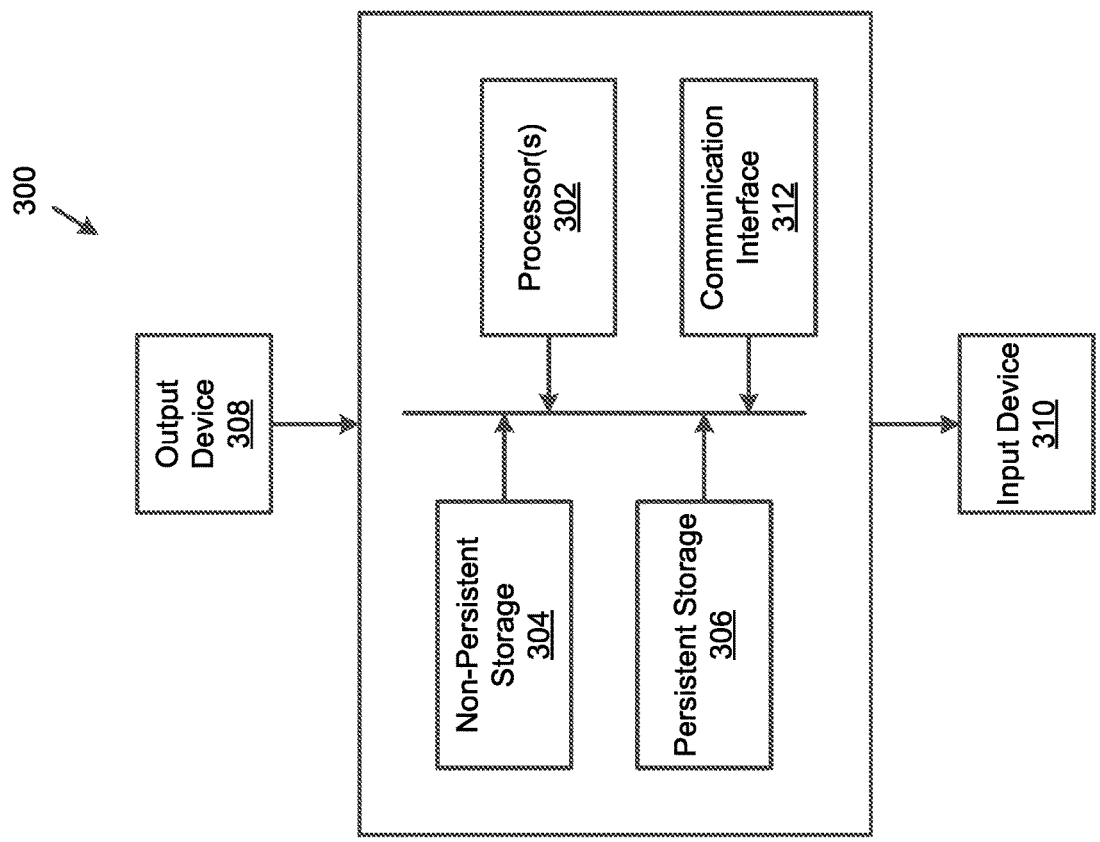
FIG. 3 shows a diagram of a computing device in accordance with one or more embodiments disclosed herein.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection. As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing training data, comprising:
   obtaining a first stream request, wherein the first stream request comprises a stream creation request and a stream specification;
   in response to obtaining the stream creation request:
      generating a new stream entry in a stream database;
      making a determination that the first stream request is associated with unstructured data;
      in response to the determination:
         obtaining a manifest associated with the unstructured data based on the stream request, wherein the manifest comprises metadata;
         loading the unstructured data into a cache using the manifest;
         merging the metadata with the unstructured data to generate training data, wherein the training data comprises a plurality of training data examples;
         generating augmented training data using the training data and the stream specification;
         generating a mini-batch sequence using the augmented training data and the stream specification;
         creating a mini-batch sequence queue and a stream endpoint; and
         streaming the mini-batch sequence using the mini-batch sequence queue and the stream endpoint, wherein the mini-batch sequence is used by a training environment to train a machine learning model.

2. The method of claim 1, wherein:
   the unstructured data comprises a plurality of unstructured data objects; and
   the metadata comprises a plurality of metadata portions.

3. The method of claim 2, wherein merging the metadata with the unstructured data to generate training data comprises:
   merging a first unstructured data object of the plurality of unstructured data objects with a first metadata portion of the plurality of metadata portions to generate a first training data example of the plurality of training data examples; and
   merging the first unstructured data object with a second metadata portion of the plurality of metadata portions to generate a second training data example of the plurality of training data examples.

4. The method of claim 1, wherein the unstructured data is loaded from a first source and the metadata is loaded from a second source.

5. The method of claim 4, wherein the manifest specifies the first source and the second source.

6. The method of claim 1, wherein the mini-batch sequence comprises:
   a plurality of mini-batches;
   end of epoch messages; and
   an end of stream message.

7. The method of claim 6, wherein a mini-batch of the mini-batch sequence comprises a randomly sampled portion of the augmented training data.

8. A system for managing training data, comprising:
   a client; and
   a training data stream manager (TDSM), comprising a processor and memory, programmed to:
      obtain a first stream request from the client, wherein the first stream request comprises a stream creation request and a stream specification;
      in response to obtaining the stream creation request:
         generate a new stream entry in a stream database;
         make a determination that the first stream request is associated with unstructured data;
         in response to the determination:
            obtain a manifest associated with the unstructured data based on the stream request, wherein the manifest comprises metadata;
            load the unstructured data into a cache using the manifest;
            merge the metadata with the unstructured data to generate training data, wherein the training data comprises a plurality of training data examples;
            generate augmented training data using the training data and the stream specification;
            generate a mini-batch sequence using the augmented training data and the stream specification;
            create a mini-batch sequence queue and a stream endpoint; and
            stream the mini-batch sequence using the mini-batch sequence queue and the stream endpoint, wherein the mini-batch sequence is used by a training environment to train a machine learning model.

9. The system of claim 8, wherein:
   the unstructured data comprises a plurality of unstructured data objects; and
   the metadata comprises a plurality of metadata portions.

10. The system of claim 9, wherein merging the metadata with the unstructured data to generate training data comprises:
    merging a first unstructured data object of the plurality of unstructured data objects with a first metadata portion of the plurality of metadata portions to generate a first training data example of the plurality of training data examples; and
    merging the first unstructured data object with a second metadata portion of the plurality of metadata portions to generate a second training data example of the plurality of training data examples.

11. The system of claim 8, wherein the unstructured data is loaded from a first source and the metadata is loaded from a second source.

12. The system of claim 11, wherein the manifest specifies the first source and the second source.

13. The system of claim 9, wherein the mini-batch sequence comprises:
    a plurality of mini-batches;
    end of epoch messages; and
    an end of stream message.

14. The system of claim 13, wherein a mini-batch of the mini-batch sequence comprises a randomly sampled portion of the augmented training data.

15. A non-transitory computer readable medium comprising computer readable program code, which when executed by a computer processor enables the computer processor to perform a method for managing training data, the method comprising:

obtaining a first stream request, wherein the first stream request comprises a stream creation request and a stream specification;

in response to obtaining the stream creation request:
generating a new stream entry in a stream database;
making a determination that the first stream request is associated with unstructured data;
in response to the determination:
obtaining a manifest associated with the unstructured data based on the stream request, wherein the manifest comprises metadata;
loading the unstructured data into a cache using the manifest;
merging the metadata with the unstructured data to generate training data, wherein the training data comprises a plurality of training data examples;
generating augmented training data using the training data and the stream specification;
generating a mini-batch sequence using the augmented training data and the stream specification;
creating a mini-batch sequence queue and a stream endpoint; and
streaming the mini-batch sequence using the mini-batch sequence queue and the stream endpoint, wherein the mini-batch sequence is used by a training environment to train a machine learning model.

16. The non-transitory computer readable medium of claim 15, wherein:
the unstructured data comprises a plurality of unstructured data objects; and
the metadata comprises a plurality of metadata portions.

17. The non-transitory computer readable medium of claim 16, wherein merging the metadata with the unstructured data to generate training data comprises:
merging a first unstructured data object of the plurality of unstructured data objects with a first metadata portion of the plurality of metadata portions to generate a first training data example of the plurality of training data examples; and
merging the first unstructured data object with a second metadata portion of the plurality of metadata portions to generate a second training data example of the plurality of training data examples.

18. The non-transitory computer readable medium of claim 15, wherein the unstructured data is loaded from a first source and the metadata is loaded from a second source.

19. The non-transitory computer readable medium of claim 18, wherein the manifest specifies the first source and the second source.

20. The non-transitory computer readable medium of claim 15, wherein the mini-batch sequence comprises:
a plurality of mini-batches;
end of epoch messages; and
an end of stream message.

* * * * *